US012461528B2

(12) United States Patent
Baron et al.

(10) Patent No.: US 12,461,528 B2
(45) Date of Patent: Nov. 4, 2025

(54) CLEANING PRIORITIZATION FOR MOBILE CLEANING ROBOT

(71) Applicant: iRobot Corporation, Bedford, MA (US)

(72) Inventors: Steven J. Baron, Nashua, NH (US); Matthew Weyant, Medford, MA (US); Ryan Schneider, Burlington, MA (US); Michael Foster, Stoneham, MA (US); Clifton Eric Smith, Stow, MA (US); Ajay Changulani, Boxborough, MA (US); Collin Prather, Westfield, IN (US); Laura Tramontozzi, Charleston, MA (US); Jonathan Sanjeev Withers, Quincy, MA (US)

(73) Assignee: iRobot Corporation, Bedford, MA (US)

( * ) Notice: Subject to any disclaimer, the term of this patent is extended or adjusted under 35 U.S.C. 154(b) by 176 days.

(21) Appl. No.: 18/237,117

(22) Filed: Aug. 23, 2023

(65) Prior Publication Data
US 2025/0068161 A1 Feb. 27, 2025

(51) Int. Cl.
*G05D 1/00* (2024.01)
*A47L 9/28* (2006.01)
*A47L 11/40* (2006.01)

(52) U.S. Cl.
CPC .......... *G05D 1/0212* (2013.01); *A47L 9/2842* (2013.01); *A47L 9/2847* (2013.01); *A47L 9/2852* (2013.01); *A47L 11/4011* (2013.01); *A47L 2201/04* (2013.01); *A47L 2201/06* (2013.01)

(58) Field of Classification Search
CPC .. G05D 1/0212; G05D 1/0274; A47L 9/2842; A47L 9/2847; A47L 9/2852; A47L 11/4011; A47L 2201/04; A47L 2201/06; A47L 9/2826
See application file for complete search history.

(56) References Cited

U.S. PATENT DOCUMENTS

| 11,561,102 | B1 | 1/2023 | Ebrahimi Afrouzi et al. |
|---|---|---|---|
| 2019/0097827 | A1 | 3/2019 | Angle et al. |
| 2020/0100639 | A1 * | 4/2020 | Ullmann ................. G05B 19/19 |
| 2020/0345192 | A1 * | 11/2020 | Zhu ......................... A47L 9/2831 |
| 2022/0061621 | A1 | 3/2022 | Weyant et al. |
| 2022/0107642 | A1 | 4/2022 | Geissler et al. |

OTHER PUBLICATIONS

"International Application Serial No. PCT US2024 042280, International Search Report mailed Dec. 3, 2024", 4 pgs.
"International Application Serial No. PCT US2024 042280, Written Opinion mailed Dec. 3, 2024", 6 pgs.

* cited by examiner

*Primary Examiner* — Bao Long T Nguyen
(74) *Attorney, Agent, or Firm* — Schwegman Lundberg & Woessner, P.A.

(57) ABSTRACT

A method of prioritizing cleaning of rooms of an environment for a mobile cleaning robot can include generating a cleanliness score for each room of the environment using a controller. Each of the cleanliness scores can be indicative of an amount of debris expected in each respective room by the mobile cleaning robot. The method can also include generating a room cleaning priority based at least partially on the cleanliness score of each of the rooms. The method can also include scheduling operations of the mobile cleaning robot for a planned mission based on the room cleaning priority of each of the rooms of the environment.

14 Claims, 22 Drawing Sheets

CLEANING PRIORITIZATION FOR MOBILE CLEANING ROBOT

TECHNICAL FIELD

Examples described herein generally relate to mobile cleaning robots and, more particularly, to systems, devices, and methods for scheduling and controlling a mobile robot.

BACKGROUND

Autonomous mobile robots can move about an environment and perform several functions and operations in a variety of categories, including but not limited to security operations, infrastructure or maintenance operations, navigation or mapping operations, inventory management operations, and robot/human interaction operations. Some mobile robots, known as cleaning robots, can autonomously perform cleaning tasks within an environment, e.g., a home. Many kinds of cleaning robots are autonomous to some degree and in different ways. For example, a cleaning robot can conduct cleaning missions, where the robot traverses and simultaneously ingests (e.g., vacuums) debris from the floor surface of the environment of the mobile cleaning robot.

Some mobile robots can store a map of the environment within which the mobile robot operates. The mobile robot can use the map to fulfill goals such as path planning or navigating the mobile robot within the environment to perform a mission such as a cleaning mission.

SUMMARY

An autonomous mobile robot (hereinafter the "mobile robot") can be controlled locally (e.g., via controls on the robot) or remotely (e.g., via a remote mobile device) to move about an environment. In examples of remote mission scheduling and robot control, a mobile application, such as implemented in a mobile device (e.g., a mobile phone), can display various information organized in at-a-glance views. A user can use the mobile application to manage (e.g., add or remove) one or more mobile robots such as in the user's home, and monitor the operating status of a mobile robot. Additionally, the user can use the mobile application to create and maintain a personalized mission routine. The mission routine can be represented by an editable schedule, including time or order, for performing one or more tasks, such as cleaning one or more rooms or floor surface areas of the user's home. The mission routine (or a task therein) can be characterized by, or made reference to, user experience such as time, pattern, or manner of using a room or interacting with an object therein, user daily routines, or user behavior. The mobile application can display, such as on the mobile device, information about the mission routine, and allow a user to monitor the progress of the mission being executed. A user can make changes to a task as it is being executed.

In various examples, the mobile application can also display a map on the user interface, such as one representing a floorplan of an area where the mission is performed. Location and operating status of the robot, progress of the mission or a task therein, among other information, can be displayed during the cleaning mission. A user can use the mobile application to generate or update a map, create new regions, add or remove objects, or providing semantic annotations to the objects on the map. The user can also control the operation of the mobile robot by adjusting a navigation parameter or a mission scheduling parameter, such as time or order of one or more tasks in a mission routine.

The inventors of the present document have discovered opportunities to improve the user experience with mobile cleaning robots by automating a cleaning schedule, which can be turned on by the user, and can automatically schedule activities for the mobile cleaning robot based on system preferences, smart clean parameters, and data from previous cleaning operations.

In examples, a method of prioritizing cleaning of rooms of an environment for a mobile cleaning robot, the method can include: generating, using a controller, a cleanliness score for each room of the environment, each of the cleanliness scores indicative of an amount of debris expected in each respective room by the mobile cleaning robot; generating a room cleaning priority based at least partially on the cleanliness score of each of the rooms; and scheduling operations of the mobile cleaning robot for a planned mission based on the room cleaning priority of each of the rooms of the environment.

In examples, a mobile cleaning robot can include: a drive system configured to move the mobile cleaning robot about an environment; a cleaning system; a memory device including instructions; and one or more processors coupled to the memory device, the one or more processors including processing circuitry that, when in operation, is configured by the instructions to: generate a cleanliness score for each room of the environment, each of the cleanliness scores indicative of an amount of debris expected in each respective room by the mobile cleaning robot; generate a room cleaning priority based at least partially on the cleanliness score of each of the rooms; and schedule operations of the mobile cleaning robot for a planned mission based on the room cleaning priority of each of the rooms of the environment.

In examples, a mobile robot system for prioritizing cleaning of rooms of an environment can include a mobile cleaning robot can include: a drive system configured to move the mobile cleaning robot about an environment; and a cleaning system; a mobile device operably in communication with the mobile cleaning robot; a memory device including instructions; and one or more processors coupled to the memory device, the one or more processors including processing circuitry that, when in operation, is configured by the instructions to: generate a cleanliness score for each room of the environment, each of the cleanliness scores indicative of an amount of debris expected in each respective room by the mobile cleaning robot; generate a room cleaning priority based at least partially on the cleanliness score of each of the rooms; and schedule operations of the mobile cleaning robot for a planned mission based on the room cleaning priority of each of the rooms of the environment.

BRIEF DESCRIPTION OF THE DRAWINGS

Various examples are illustrated in the figures of the accompanying drawings. Such examples are demonstrative and not intended to be exhaustive or exclusive examples of the present subject matter.

DETAILED DESCRIPTION

Figure 1:
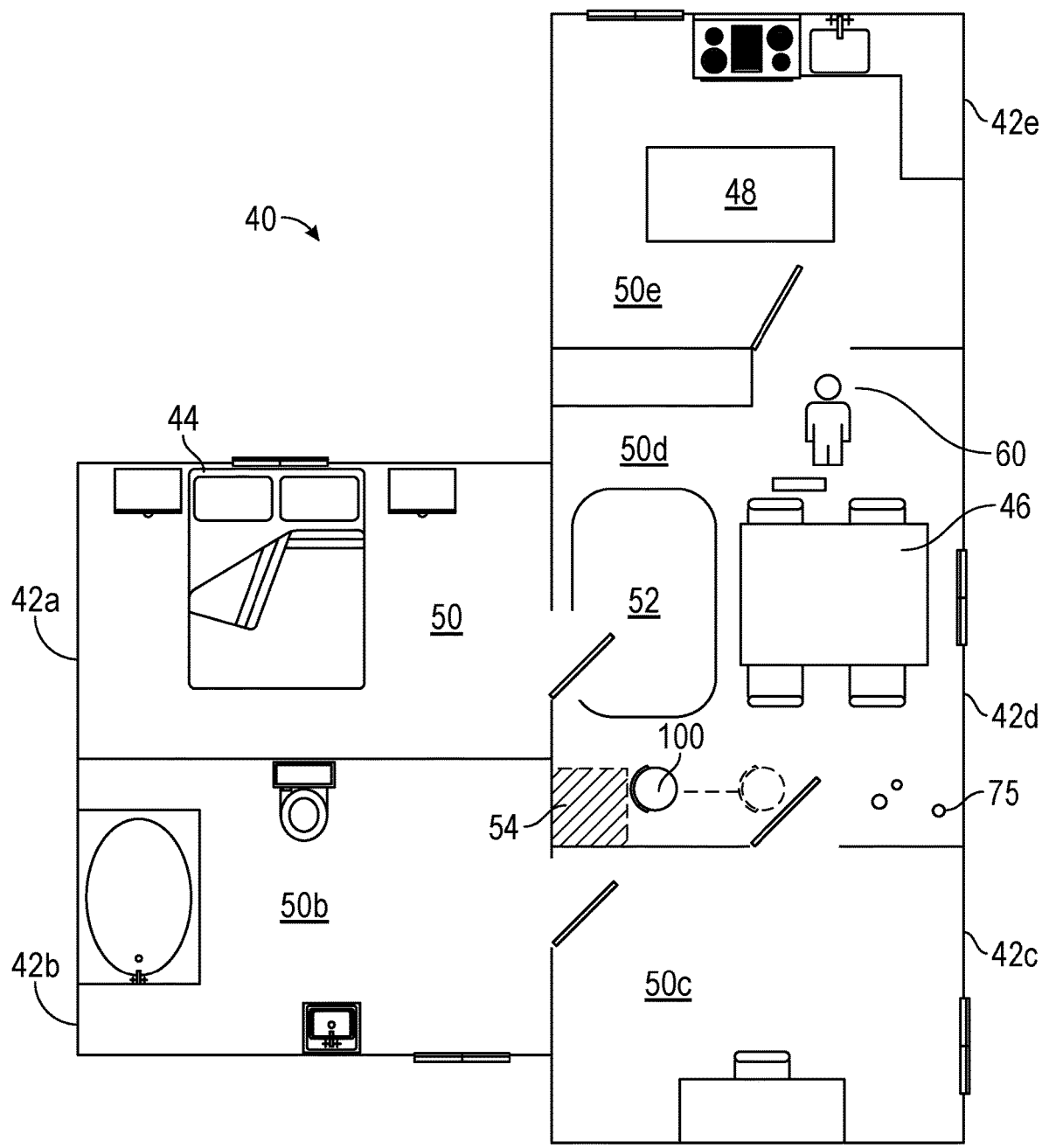
FIG. 1 illustrates a plan view of a mobile cleaning robot in an environment.

An autonomous mobile robot can be controlled locally or remotely to execute a mission, such as a cleaning mission involving rooms or floor surface areas to be cleaned by a mobile cleaning robot. A user can use a remote control device to display a map of the environment, create a cleaning mission on a user interface (UI) of the remote control device, control the mobile robot to execute the cleaning mission, and connect the mobile robot to interact with other smart home devices, services, or ecosystems. Time-based schedules have been used in conventional mobile robots. For example, a user can program or select certain day(s) or time periods for a cleaning mission or certain tasks therein. The time-based scheduling can take different forms, such as in association with personal daily schedules or events, such as times to wake up, times to go to work, times to come home, or the like. The time-based scheduling has several disadvantages. First, as a mission can include multiple tasks each requiring separate time schedules, manual scheduling can be tedious and time-consuming. In practice, however, some missions are highly repeatable routines. Repeated mission creation can add burden to a user and increase the chance of introducing human errors or inconsistency between the missions. Second, the time-based schedule is generally static and lacks the capability of adapting to a change of schedule. For example, the time for "return home from work" can vary due to traffic or other exceptional events. Lacking the desired automation, a user can need to manually set up new time schedules or start ad-hoc robot missions to handle exceptions, which can be tedious and inconvenient especially for users with a busy lifestyle.

Conventional robot scheduling is also largely a map-based approach, in which the user defines a mission as rooms or floor surface areas on a map that need to be cleaned. The map-and-location approach can be disadvantageous as it is may not be customized to meet an individual user's needs or unique goals. For example, a map-and-room based cleaning mission does not accommodate a user's preferences of time, location, or a pattern of room cleaning, or the user's past experience or habit of using the mobile robot in the environment or have knowledge of a user's real-time location inside or outside of the home. The map-and-location approach also can lack contextual content of a mission, such as spatial or temporal context of the mission or a task therein. For example, the user can be engaged in certain activities and does not want to be disturbed by the mobile robot moving around to execute a schedule mission (e.g., according to a time-based schedule). The map-and-location approach can disadvantageously limit the user's experience with mission scheduling and the usability of robot control. In contrast, mission schedules made reference to, and triggered by, a user's behavior or other contextual information in the home can be more desirable than the map-based schedules.

The present disclosure helps to address an unmet need for devices and methods for improving mission scheduling and mobile robot control with enhanced automaticity by leveraging one or more of historical run data from the mobile cleaning robot or time-based degradation data to update a predicted cleanliness of each room cleaned by the mobile cleaning robot to prioritize and execute a cleaning schedule that can meet the cleaning needs of the user with little to no input from the user.

Examples of Autonomous Mobile Robots

FIG. 1 illustrates a plan view of a mobile cleaning robot 100 in an environment 40, in accordance with at least one example of this disclosure. The environment 40 can be a dwelling, such as a home or an apartment, and can include rooms 42*a*-42*e*. Obstacles, such as a bed 44, a table 46, and an island 48 can be located in the rooms 42 of the environment. Each of the rooms 42*a*-42*e* can have a floor surface 50*a*-50*e*, respectively. Some rooms, such as the room 42*d*, can include a rug, such as a rug 52. The floor surfaces 50 can be of one or more types such as hardwood, ceramic, low-pile carpet, medium-pile carpet, long (or high)-pile carpet, stone, or the like.

The mobile cleaning robot 100 can be operated, such as by a user 60, to autonomously clean the environment 40 in a room-by-room fashion. In examples, the robot 100 can clean the floor surface 50*a* of one room, such as the room 42*a*, before moving to the next room, such as the room 42*d*, to clean the surface of the room 42d. Different rooms can have different types of floor surfaces. For example, the room 42e (which can be a kitchen) can have a hard floor surface, such as wood or ceramic tile, and the room 42a (which can be a bedroom) can have a carpet surface, such as a medium pile carpet. Other rooms, such as the room 42d (which can be a dining room) can include multiple surfaces where the rug 52 is located within the room 42d.

During cleaning or traveling operations, the robot 100 can use data collected from various sensors (such as optical sensors) and calculations (such as odometry and obstacle detection) to develop a map of the environment 40. Once the map is created, the user 60 can define rooms or zones (such as the rooms 42) within the map. The map can be presentable to the user 60 on a user interface, such as a mobile device, where the user 60 can direct or change cleaning preferences, for example.

Also, during operation, the robot 100 can detect surface types within each of the rooms 42, which can be stored in the robot 100 or another device. The robot 100 can update the map (or data related thereto) such as to include or account for surface types of the floor surfaces 50a-50e of each of the respective rooms 42 of the environment 40. In examples, the map can be updated to show the different surface types such as within each of the rooms 42.

In examples, the user 60 can define a behavior control zone 54. In autonomous operation, the robot 100 can initiate a behavior in response to being in or near the behavior control zone 54. For example, the user 60 can define an area of the environment 40 that is prone to becoming dirty to be the behavior control zone 54. In response, the robot 100 can initiate a focused cleaning behavior in which the robot 100 performs a focused cleaning of a portion of the floor surface 50d in the behavior control zone 54.

Figure 2A:
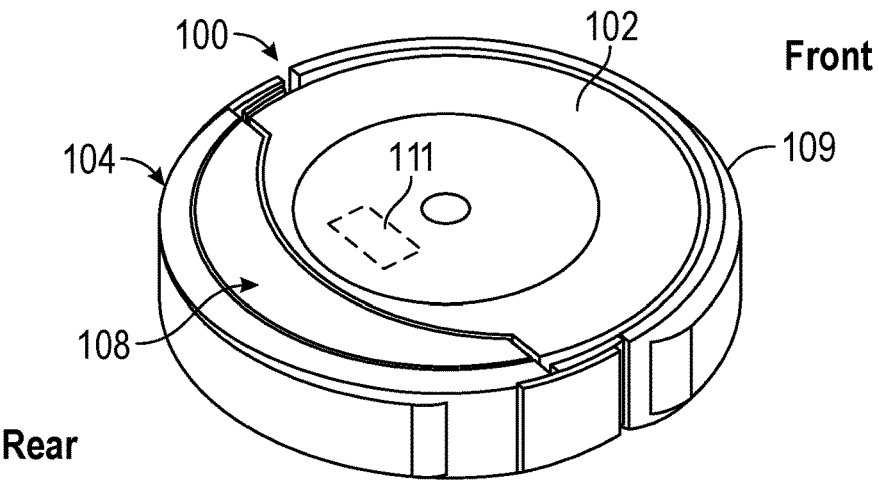
FIG. 2A illustrates an isometric view of a mobile cleaning robot in a first condition.
Figure 2B:
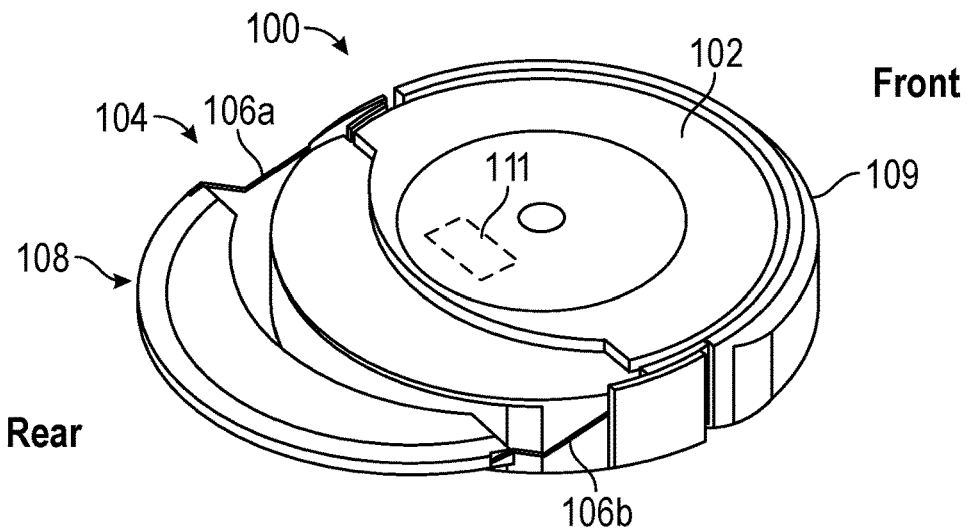
FIG. 2B illustrates an isometric view of a mobile cleaning robot in a second condition.
Figure 2C:
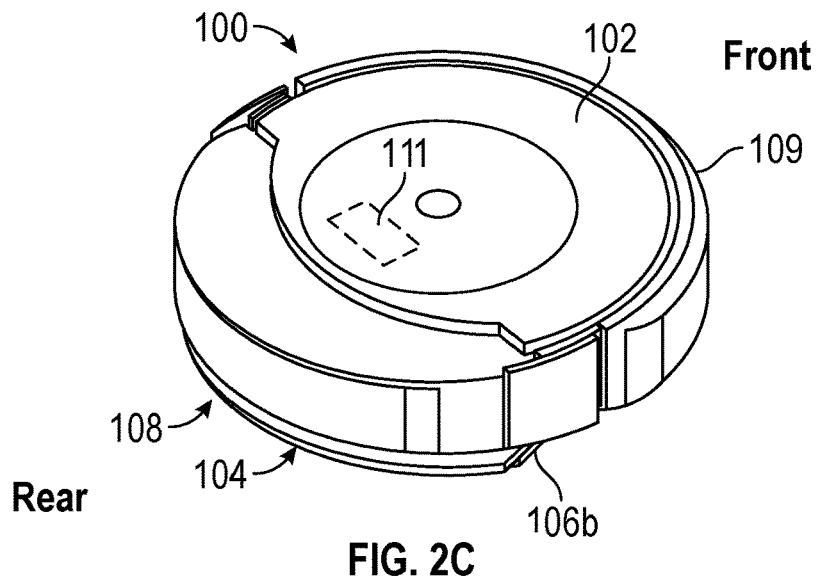
FIG. 2C illustrates an isometric view of a mobile cleaning robot in a third condition.

FIGS. 2A-2C are discussed together below. FIG. 2A illustrates an isometric view of a mobile cleaning robot 100 with a pad assembly in a stored position. FIG. 2B illustrates an isometric view of the mobile cleaning robot 100 with the pad assembly in an extended position. FIG. 2C illustrates an isometric view of the mobile cleaning robot 100 with the pad assembly in a mopping position. FIGS. 2A-2C also show orientation indicators Front and Rear.

The mobile cleaning robot 100 can include a body 102 and a mopping system 104. The mopping system 104 can include arms 106a and 106b (referred to together as arms 106) and a pad assembly 108. The robot 100 can also include a bumper 109 and other features such as an extractor (including rollers), one or more side brushes, a vacuum system, a controller, a drive system (e.g., motor, geartrain, and wheels), a caster, and sensors, as discussed in further detail below. A distal portion of the arms 106 can be connected to the pad assembly 108 and a proximal portion of the arms 106a and 106b can be connected to an internal drive system to drive the arms 106 to move the pad assembly 108.

Figure 2D:
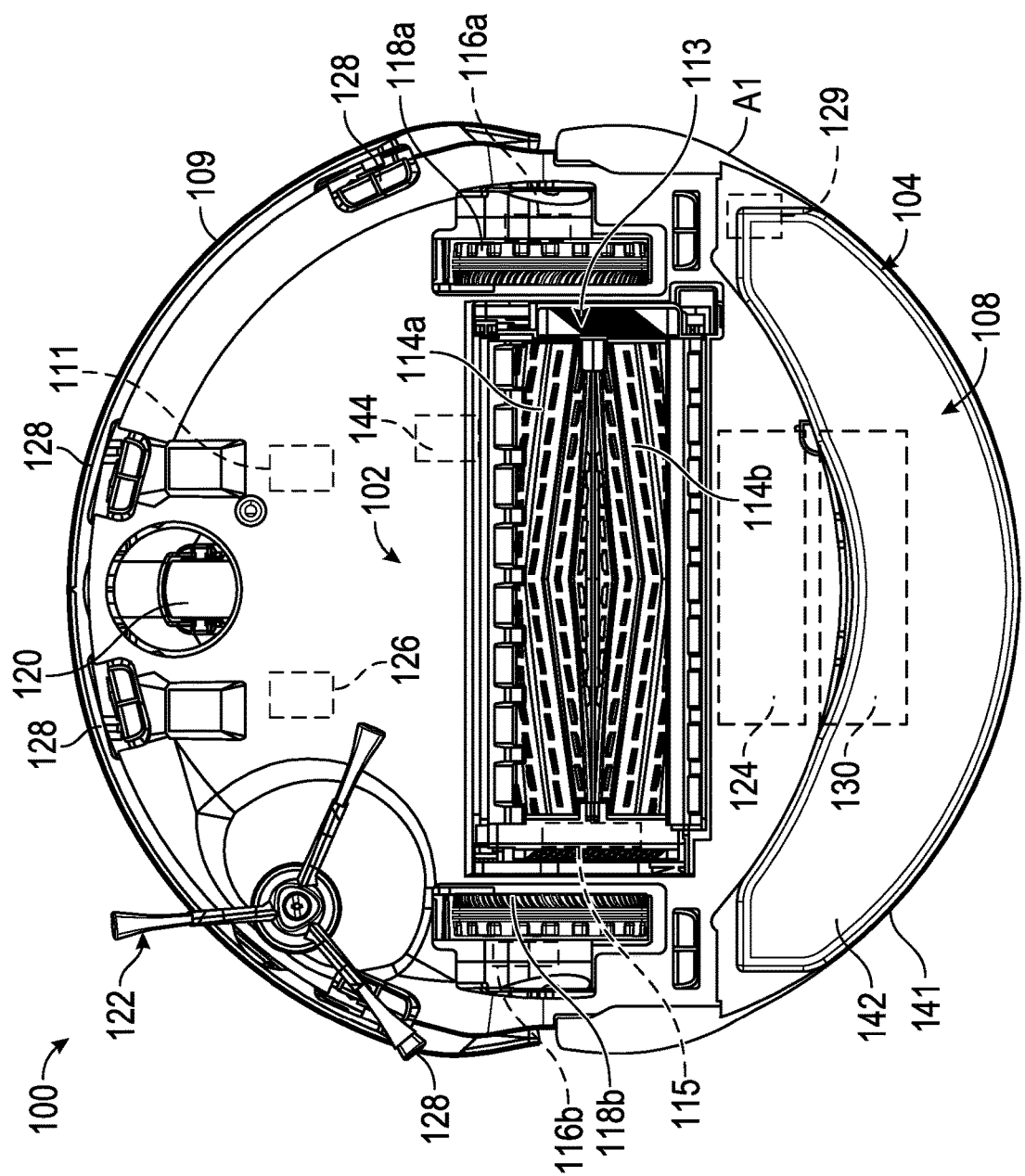
FIG. 2D illustrates a bottom view of a mobile cleaning robot in a third condition.
Figure 2E:
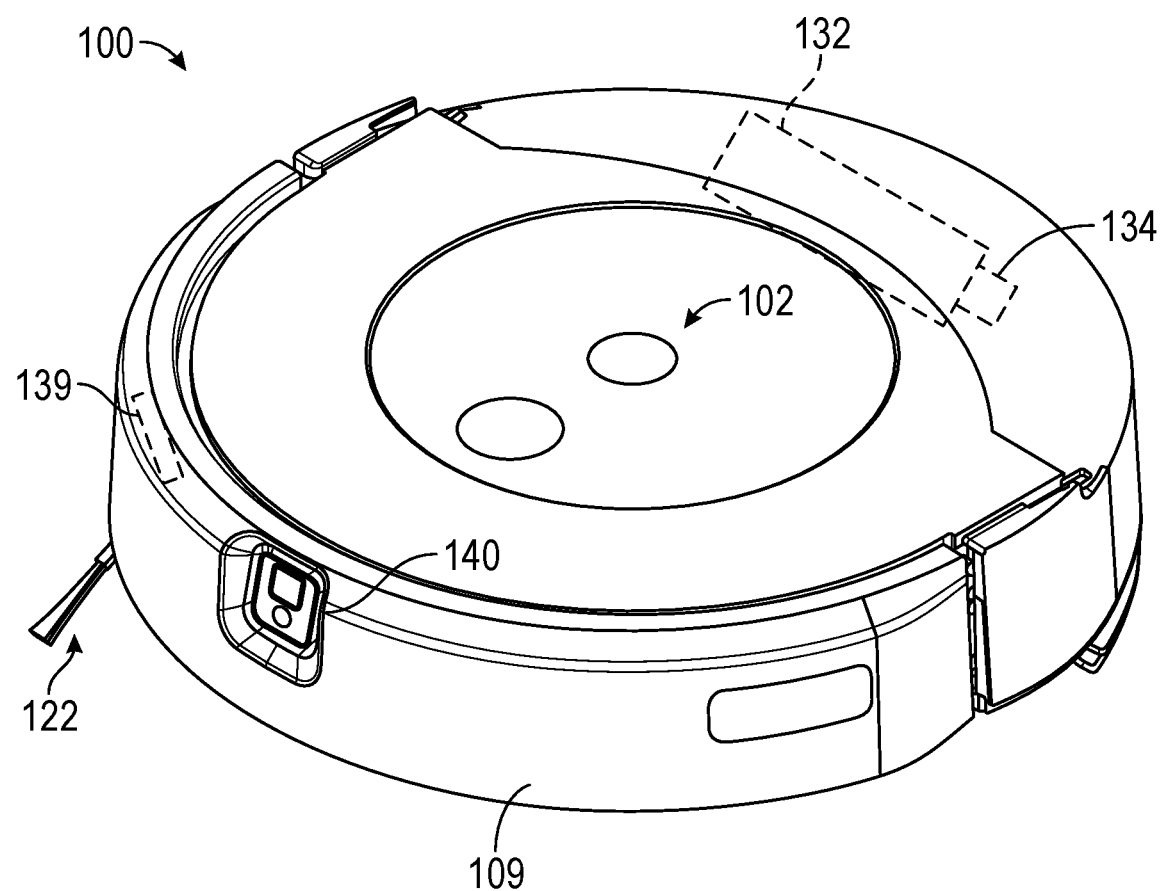
FIG. 2E illustrates a top isometric view of a mobile cleaning robot in a third condition.

FIGS. 2A-2C show how the robot 100 can be operated to move the pad assembly 108 from a stored position in FIG. 2A to a transition or partially deployed position in FIG. 2B, to a mopping or a deployed position in FIG. 2C. In the stored position of FIG. 2A, the robot 100 can perform only vacuuming operations. In the deployed position of FIG. 2C, the robot 100 can perform vacuuming operations or mopping operations. FIGS. 2D-2E discuss additional components of the robot 100.

FIG. 2D illustrates a bottom view of the mobile cleaning robot 100 and FIG. 2E illustrates a top isometric view of the robot 100. FIGS. 2D and 2E are discussed together below.

The robot 100 of FIGS. 2D and 2E can be consistent with FIGS. 2A-2C; FIGS. 2D-2E show additional details of the robot 100 For example, FIGS. 2D-2E show that the robot 100 can include a body 102, a bumper 109, an cleaning assembly 113 (including rollers 114a and 114b), actuators 116a and 116b, drive wheels 118a and 118b, a caster wheel 120, a side brush assembly 122, a vacuum assembly 124, memory 126, sensors 128, and a cleaning bin 130. The mopping system 104 can also include a tank 132 and a pump 134.

The cleaning robot 100 can be an autonomous cleaning robot that autonomously traverses the floor surface 50 (of FIG. 1) while ingesting the debris from different parts of the floor surface 50. As shown in FIG. 2D, the robot 100 can include the body 102 that can be movable across the floor surface 50. The body 102 can include multiple connected structures to which movable or fixed components of the cleaning robot 100 are mounted. The connected structures can include, for example, an outer housing to cover internal components of the cleaning robot 100, a chassis to which the drive wheels 118a and 118b and the cleaning rollers 114a and 114b (of the cleaning assembly 113) are mounted, and the bumper 109 connected to the outer housing. The caster wheel 120 can support the front portion of the body 102 above the floor surface 50, and the drive wheels 118a and 118b can support the middle and rear portions of the body 102 (and can also support a majority of the weight of the robot 100) above the floor surface 50.

As shown in FIG. 2D, the body 102 can include a front portion that can have a substantially semicircular shape and that can be connected to the bumper 109. The body 102 can also include a rear portion that has a substantially semicircular shape. In other examples, the body 102 can have other shapes such as a square front or straight front. The robot 100 can also include a drive system including the actuators (e.g., motors) 116a and 116b. The actuators 116a and 116b can be connected to the body 102 and can be operably connected to the drive wheels 118a and 118b, which can be rotatably mounted to the body 102. The actuators 116a and 116b, when driven, can rotate the drive wheels 118a and 118b to enable the robot 100 to autonomously move across the floor surface 50.

The vacuum assembly 124 can be located at least partially within the body 102 of the robot 100, such as in a rear portion of the body 102, and can be located in other locations in other examples. The vacuum assembly 124 can include a motor to drive an impeller that generates the airflow when rotated. The airflow and the cleaning rollers 114, when rotated, can cooperate to ingest the debris into the robot 100. The cleaning bin 130 can be mounted in the body 102 and can contain the debris ingested by the robot 100. A filter in the body 102 can separate the debris from the airflow before the airflow enters the vacuum assembly 124 and is exhausted out of the body 102. In this regard, the debris can be captured in both the cleaning bin 130 and the filter before the airflow is exhausted from the body 102. In examples, the vacuum assembly 124 and cleaning assembly 113 can be optionally included or can be of a different type. Optionally, the vacuum assembly 124 can be operated during mopping operations, such as those including the mopping system 104. That is, the robot 100 can perform simultaneous vacuuming and mopping missions or operations.

The cleaning rollers 114a and 114b can be operably connected to an actuator 115, e.g., a motor, through a gearbox. The cleaning assembly 113 and the cleaning rollers 114a and 114b can be positioned forward of the cleaning bin 130. The cleaning rollers 114 can be mounted to an underside of the body 102 so that the cleaning rollers 114a and 114b engage debris on the floor surface 50 during the cleaning operation when the underside of the body 102 faces the floor surface 50. FIG. 2D further shows that the pad assembly 108 can include a brake 129 that can be configured to engage a portion of the pad assembly 108 to limit movement or motion of a mopping pad 142 (and a pad tray 141 to which the mopping pad 142 is connected) with respect to the body 102. In examples, the mopping pad 142 can support rear portions of the body 102 when the mobile cleaning robot 100 is in mopping mode. The cleaning bin 130 can also sit on top of the mopping pad 142.

The controller 111 can be located within the body 102 and can be a programmable controller, such as a single or multi-board computer, a direct digital controller (DDC), a programmable logic controller (PLC), or the like. In other examples, the controller 111 can be any computing device, such as a handheld computer, for example, a smart phone, a tablet, a laptop, a desktop computer, or any other computing device including a processor, memory, and communication capabilities. The memory 126 can be one or more types of memory, such as volatile or non-volatile memory, read-only memory (ROM), random-access memory (RAM), magnetic disk storage media, optical storage media, flash-memory devices, and other storage devices and media. The memory 126 can be located within the body 102, connected to the controller 111 and accessible by the controller 111.

The controller 111 can operate the actuators 116a and 116b to autonomously navigate the robot 100 about the floor surface 50 during a cleaning operation. The actuators 116a and 116b can be operable to drive the robot 100 in a forward drive direction, in a backwards direction, and to turn the robot 100. The controller 111 can operate the vacuum assembly 124 to generate an airflow that flows through an air gap near the cleaning rollers 114, through the body 102, and out of the body 102.

The control system can further include a sensor system with one or more electrical sensors. The sensor system, as described herein, can generate a signal indicative of a current location of the robot 100, and can generate signals indicative of locations of the robot 100 as the robot 100 travels along the floor surface 50. The sensors 128 (shown in FIG. 2D) can be located along a bottom portion of the body 102. Each of the sensors 128 can be an optical sensor that can be configured to detect a presence or absence of an object below the optical sensor, such as the floor surface 50. The sensors 128 (optionally cliff sensors) can be connected to the controller 111 and can be used by the controller 111 to navigate the robot 100 within the environment 40. In examples, the cliff sensors can be used to detect a floor surface type which the controller 111 can use to selectively operate the mopping system 104.

The cleaning pad assembly 108 can be a cleaning pad connected to the bottom portion of the body 102 (or connected to a moving mechanism configured to move the assembly 108 between a stored position and a cleaning position), such as to the cleaning bin 130 in a location to the rear of the cleaning assembly 113. The tank 132 can be a water tank configured to store water or fluid, such as cleaning fluid, for delivery to a mopping pad 142. The pump 134 can be connected to the controller 111 and can be in fluid communication with the tank 132. The controller 111 can be configured to operate the pump 134 to deliver fluid to the mopping pad 142 during mopping operations. The controller 111 can also be configured to operate the pump 134 to deliver fluid around the mopping pad 142 during mopping operations. In examples, the pad 142 can be a dry pad such as for dusting or dry debris removal. The pad 142 can also be any cloth, fabric, or the like configured for cleaning (either wet or dry) of a floor surface.

In operation of some examples, the controller 111 can be used to instruct the robot 100 to perform a mission. In such a case, the controller 111 can operate the actuators 116 to drive the drive wheels 118 and propel the robot 100 along the floor surface 50. The robot 100 can be propelled in a forward drive direction or a rearward drive direction. The robot 100 can also be propelled such that the robot 100 turns in place or turns while moving in the forward drive direction or the rearward drive direction. In addition, the controller 111 can operate the actuators 115 to cause the rollers 114a and 114b to rotate, can operate the side brush assembly 122, and can operate the motor of the vacuum assembly 124 to generate airflow. The controller 111 can execute software stored on the memory 126 to cause the robot 100 to perform various navigational and cleaning behaviors by operating the various motors of the robot 100.

The various sensors of the robot 100 can be used to help the robot navigate and clean within the environment 40. For example, the cliff sensors can detect obstacles such as drop-offs and cliffs below portions of the robot 100 where the cliff sensors are disposed. The cliff sensors can transmit signals to the controller 111 so that the controller 111 can redirect the robot 100 based on signals from the sensors.

Proximity sensors can produce a signal based on a presence or the absence of an object in front of the optical sensor. For example, detectable objects include obstacles such as furniture, walls, persons, and other objects in the environment 40 of the robot 100. The proximity sensors can transmit signals to the controller 111 so that the controller 111 can redirect the robot 100 based on signals from the proximity sensors. In examples, a bump sensor can be used to detect movement of the bumper 109 along a fore-aft axis of the robot 100. A bump sensor 139 can also be used to detect movement of the bumper 109 along one or more sides of the robot 100 and can optionally detect vertical bumper movement. The bump sensors 139 can transmit signals to the controller 111 so that the controller 111 can redirect the robot 100 based on signals from the bump sensors 139.

The robot 100 can also optionally include one or more dirt sensors 144 connected to the body 102 and in communication with the controller 111. The dirt sensors 144 can be a microphone, piezoelectric sensor, optical sensor, or the like located in or near a flow path of debris, such as near an opening of the cleaning rollers 114 or in one or more ducts within the body 102. This can allow the dirt sensor(s) 144 to detect how much dirt is being ingested by the vacuum assembly 124 (e.g., via the cleaning assembly 113) at any time during a cleaning mission. Because the robot 100 can be aware of its location, the robot 100 can keep a log or record of which areas or rooms of the map are dirtier or where more dirt is collected. This information can be used in several ways, as discussed further below.

The image capture device 140 can be configured to generate a signal based on imagery of the environment 40 of the robot 100 as the robot 100 moves about the floor surface 50. The image capture device 140 can transmit such a signal to the controller 111. The controller 111 can use the signal or signals from the image capture device 140 for various tasks, algorithms, or the like, as discussed in further detail below.

In examples, the obstacle following sensors can detect detectable objects, including obstacles such as furniture, walls, persons, and other objects in the environment of the robot 100. In some implementations, the sensor system can include an obstacle following sensor along the side surface, and the obstacle following sensor can detect the presence or the absence an object adjacent to the side surface. The one or more obstacle following sensors can also serve as obstacle detection sensors, similar to the proximity sensors described herein.

The robot 100 can also include sensors for tracking a distance travelled by the robot 100. For example, the sensor system can include encoders associated with the motors 116 for the drive wheels 118, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The controller 111 can use data collected by the sensors of the sensor system to control navigational behaviors of the robot 100 during the mission. For example, the controller 111 can use the sensor data collected by obstacle detection sensors of the robot 100, (the cliff sensors, the proximity sensors, and the bump sensors) to enable the robot 100 to avoid obstacles within the environment of the robot 100 during the mission.

The sensor data can also be used by the controller 111 for simultaneous localization and mapping (SLAM) techniques in which the controller 111 extracts features of the environment represented by the sensor data and constructs a map of the floor surface 50 of the environment. The sensor data collected by the image capture device 140 can be used for techniques such as vision-based SLAM (VSLAM) in which the controller 111 extracts visual features corresponding to objects in the environment 40 and constructs the map using these visual features. As the controller 111 directs the robot 100 about the floor surface 50 during the mission, the controller 111 can use SLAM techniques to determine a location of the robot 100 within the map by detecting features represented in collected sensor data and comparing the features to previously stored features. The map formed from the sensor data can indicate locations of traversable and non-traversable space within the environment. For example, locations of obstacles can be indicated on the map as non-traversable space, and locations of open floor space can be indicated on the map as traversable space.

The sensor data collected by any of the sensors can be stored in the memory 126. In addition, other data generated for the SLAM techniques, including mapping data forming the map, can be stored in the memory 126. These data produced during the mission can include persistent data that are produced during the mission and that are usable during further missions. In addition to storing the software for causing the robot 100 to perform its behaviors, the memory 126 can store data resulting from processing of the sensor data for access by the controller 111. For example, the map can be a map that is usable and updateable by the controller 111 of the robot 100 from one mission to another mission to navigate the robot 100 about the floor surface 50.

The persistent data, including the persistent map, can help to enable the robot 100 to efficiently clean the floor surface 50. For example, the map can enable the controller 111 to direct the robot 100 toward open floor space and to avoid nontraversable space. In addition, for subsequent missions, the controller 111 can use the map to optimize paths taken during the missions to help plan navigation of the robot 100 through the environment 40.

The controller 111 can also send commands to a motor (internal to the body 102) to drive the arms 106 to move the pad assembly 108 between the stored position (shown in FIGS. 2A and 2D) and the deployed position (shown in FIGS. 2C and 2E). In the deployed position, the pad assembly 108 (the mopping pad 142) can be used to mop a floor surface of any room of the environment 40.

The mopping pad 142 can be a dry pad or a wet pad. Optionally, when the mopping pad 142 is a wet pad, the pump 134 can be operated by the controller 111 to spray or drop fluid (e.g., water or a cleaning solution) onto the floor surface 50 or the mopping pad 142. The wetted mopping pad 142 can then be used by the robot 100 to perform wet mopping operations on the floor surface 50 of the environment 40. As discussed in further detail below, the controller 111 can determine when to move the pad tray 141 and the mopping pad 142 between the stored position and the cleaning position.

Figure 3:
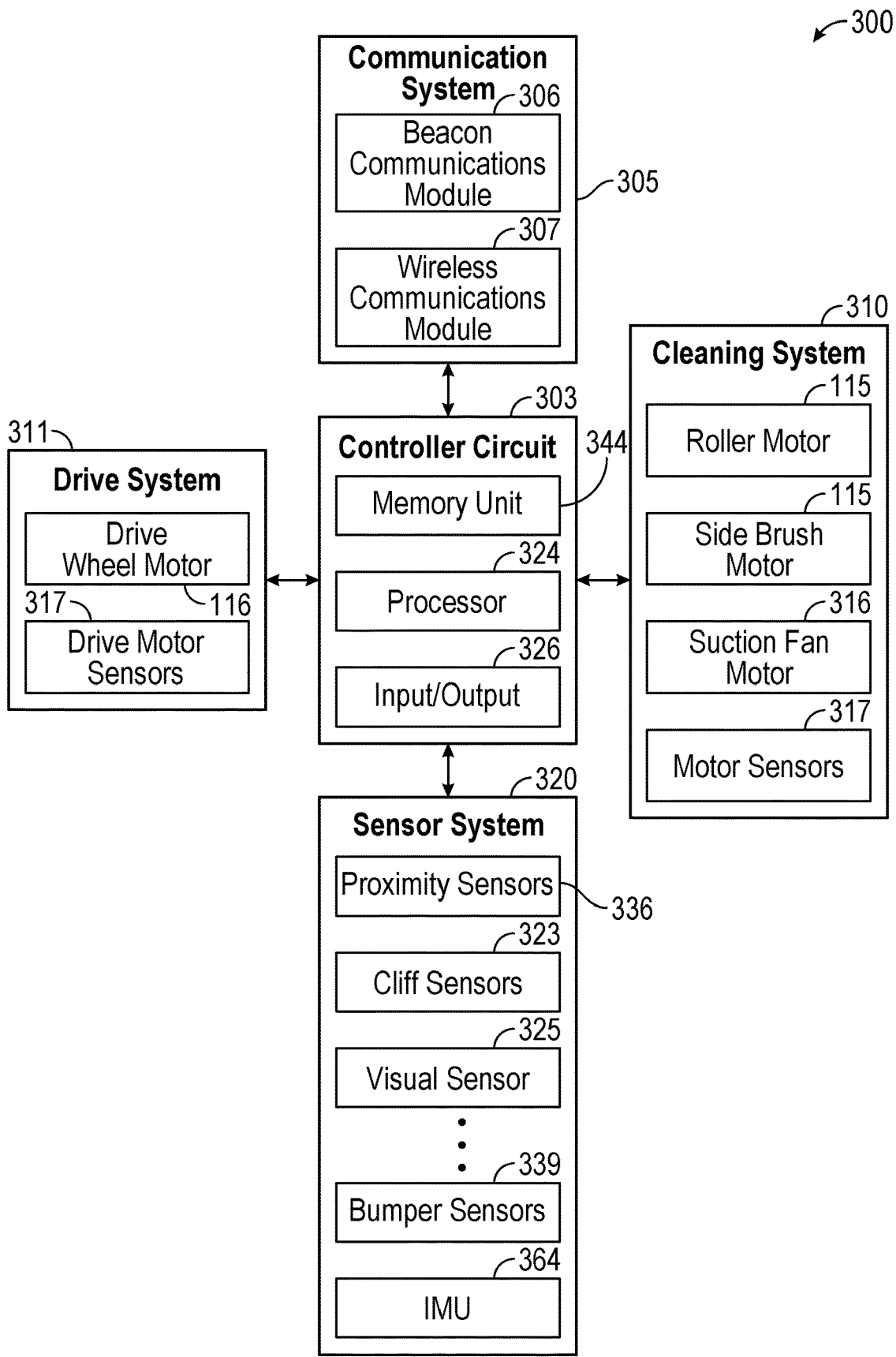
FIG. 3 illustrates a diagram illustrating an example of a control architecture for operating a mobile cleaning robot.

FIG. 3 is a diagram illustrating an example of a control architecture 300 for operating a mobile cleaning robot. A controller circuit 303 can be communicatively coupled to various subsystems of the mobile robot 100, including a communications system 305, a cleaning system 310, a drive system 311, and a sensor system 320. The controller circuit 303 can include a memory storage element 344 that can hold data and instructions for processing by a processor 324. The processor 324 can receive program instructions and feedback data from the memory storage element 344, execute logical operations called for by the program instructions, and generate command signals for operating the respective subsystem components of the mobile robot 100. An input/output unit 326 can transmit the command signals and receive feedback from the various illustrated components.

The communications system 305 can include a beacon communications module 306 and a wireless communications module 307. The beacon communications module 306 can be communicatively coupled to the controller circuit 303. In examples, the beacon communications module 306 can be operable to send and receive signals to and from a remote device. For example, the beacon communications module 306 can detect a navigation signal projected from an emitter of a navigation or virtual wall beacon or a homing signal projected from the emitter of a docking station. Docking, confinement, home base, and homing technologies are discussed in U.S. Pat. Nos. 7,196,487 and 7,404,000, U.S. Patent Application Publication No. 20050156562, and U.S. Patent Application Publication No. 20140100693 (the entireties of which are hereby incorporated by reference). As described in U.S. Patent Publication 2014/0207282 (the entirety of which is hereby incorporated by reference), the wireless communications module 307 can facilitate the communication of information describing a status of the mobile robot 100 over a suitable wireless network (e.g., a wireless local area network) with one or more mobile devices (e.g., mobile device 404 shown in FIG. 4A). More details of the communications system 305 are discussed below, such as with reference to FIG. 4A.

The cleaning system 310 can include the actuator 116 for driving the side brush assembly 122, and a suction fan motor 316 for the vacuum assembly 124. The cleaning system 310 can also include multiple motor sensors 317 that can monitor operation of the actuator 116 and the suction fan motor 316 to facilitate closed-loop control of the motors by the controller circuit 303. In examples, the actuator 116 is operated by the controller circuit 303 (or a suitable microcontroller) to drive the rollers (e.g., cleaning rollers 114) according to a particular speed setting via a closed-loop pulse-width modulation (PWM) technique, where the feedback signal can be received from a motor sensor 317 monitoring a signal indicative of the rotational speed of the actuator 116. For example, such a motor sensor 317 can be provided in the form of a motor current sensor (e.g., a shunt resistor, a current-sensing transformer, or a Hall Effect current sensor).

The drive system 311 can include the actuator 116 for operating the drive wheels 118 in response to drive commands or control signals from the controller circuit 303, as well as motor sensors 317 attached to the actuator 116 to facilitate closed-loop control of the drive wheels (e.g., via a suitable PWM technique as described above). In examples, a microcontroller assigned to the drive system 311 can be configured to decipher drive commands having x, y, and θ components. The controller circuit 303 can transmit individual control signals to the actuator 116. In any event, the controller circuit 303 can maneuver the mobile robot 100 in any direction across a cleaning surface by independently controlling the rotational speed and direction of each drive wheel 118 via the actuator 116.

The controller circuit 303 can operate the drive system 311 in response to signals received from the sensor system 320. For example, the controller circuit 303 can operate the drive system 311 to redirect the mobile robot 100 to avoid obstacles and clutter encountered while treating a floor surface. In another example, if the mobile robot 100 becomes stuck or entangled during use, the controller circuit 303 can operate the drive system 311 according to one or more escape behaviors. To achieve reliable autonomous movement, the sensor system 320 can include several different types of sensors that can be used in combination to allow the mobile robot 100 to make intelligent decisions about a particular environment. The sensor system 320 can include one or more of proximity sensors 336 (such as the sensors 128), the cliff sensors 323 (such as the sensors 128), a visual sensor 325 such as the image capture device 140 can be configured for detecting features and landmarks in the operating environment and building a virtual map, such as using VSLAM technology, as described above.

The sensor system 320 can further include bumper sensors 339 (such as the bumper sensors 139a and 139b), responsive to activation of the bumper 109. The sensor system 320 can include an inertial measurement unit (IMU) 364 that is, in part, responsive to changes in position of the mobile robot 100 with respect to a vertical axis substantially perpendicular to the floor and senses when the mobile robot 100 is pitched at a floor type interface having a difference in height, which is potentially attributable to a flooring type change. In examples, the IMU 364 is a six-axis IMU having a gyro sensor that measures the angular velocity of the mobile robot 100 relative to the vertical axis. However, other suitable configurations are also contemplated. For example, the IMU 364 can include an accelerometer sensitive to the linear acceleration of the mobile robot 100 along the vertical axis. In any event, output from the IMU 364 is received by the controller circuit 303 and processed to detect a discontinuity in the floor surface across which the mobile robot 100 is traveling. Within the context of the present disclosure the terms "flooring discontinuity" and "threshold" refer to any irregularity in the floor surface (e.g., a change in flooring type or change in elevation at a flooring interface) that is traversable by the mobile robot 100, but that causes a discrete vertical movement event (e.g., an upward or downward "bump"). The vertical movement event could refer to a part of the drive system (e.g., one of the drive wheels 118) or the body 102 of the robot 100, depending on the configuration and placement of the IMU 364. Detection of a flooring threshold, or flooring interface, can prompt the controller circuit 303 to expect a change in floor type. For example, the mobile robot 100 can experience a significant downward vertical bump as it moves from high pile carpet (a soft floor surface) to a tile floor (a hard floor surface), and an upward bump in the opposite case.

A wide variety of other types of sensors, though not shown or described in connection with the illustrated examples, can be incorporated in the sensor system 320 (or any other subsystem) without departing from the scope of the present disclosure. Such sensors can function as obstacle detection units, obstacle detection obstacle avoidance (ODOA) sensors, wheel drop sensors, obstacle-following sensors, stall-sensor units, drive-wheel encoder units, bumper sensors, and the like.

Examples of Communication Networks

Figure 4A:
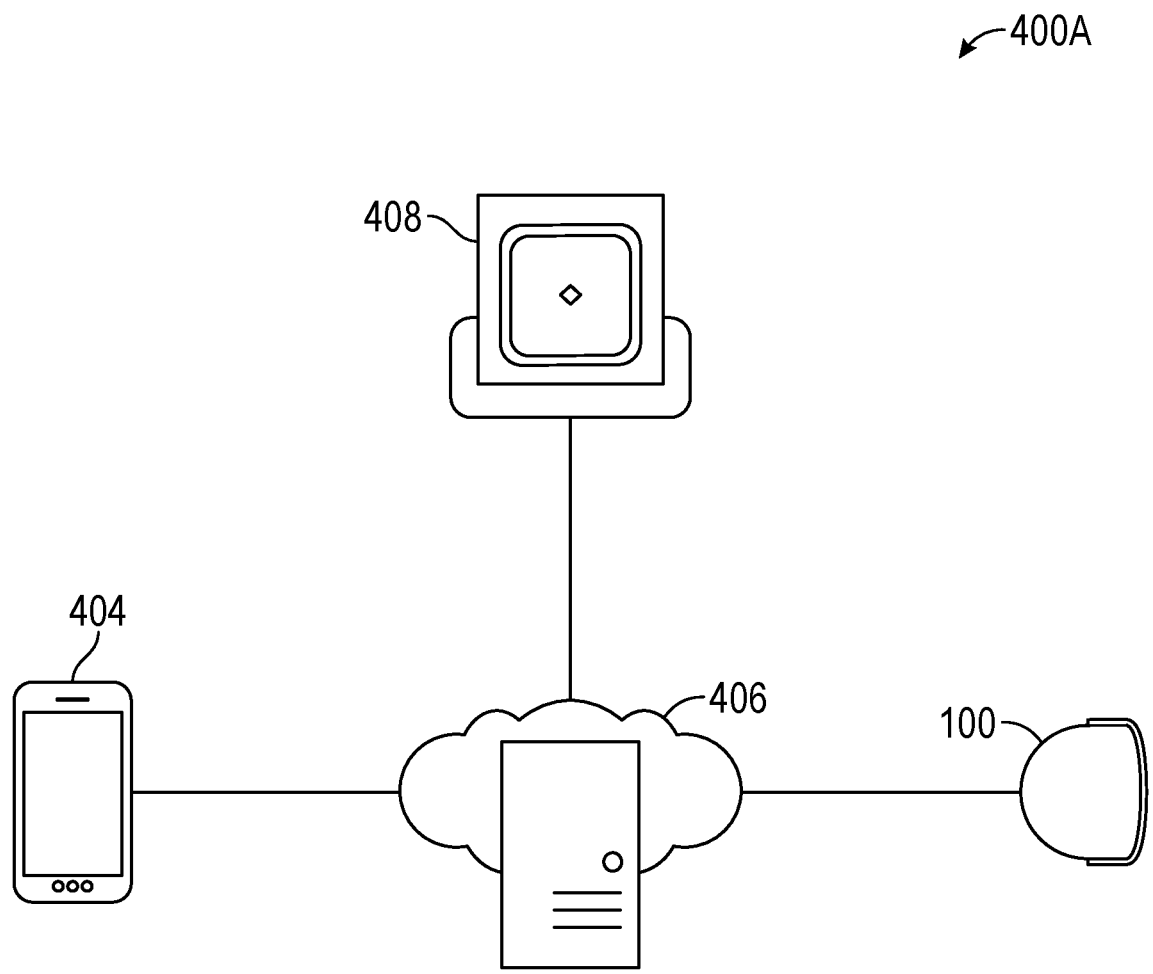
FIG. 4A illustrates a diagram illustrating an example of a communication network in which a mobile cleaning robot operates and data transmission in the network.

FIG. 4A illustrates a communication network 400A that enables networking between the mobile robot 100 and one or more other devices, such as a mobile device 404, a cloud computing system 406, or another robot 408 separate from the mobile device 404. Using the communication network 400A, the mobile robot 100, the mobile device 404, the robot 408, and the cloud computing system 406 can communicate with one another to transmit data to one another and receive data from one another. In some implementations, the mobile robot 100, the robot 408, or both the mobile robot 100 and the robot 408 communicate with the mobile device 404 through the cloud computing system 406. Alternatively or additionally, the mobile robot 100, the robot 408, or both the mobile robot 100 and the robot 408 communicate directly with the mobile device 404. Various types and combinations of wireless networks (e.g., Bluetooth, radio frequency, optical based, or the like.) and network architectures (e.g., mesh networks) can be employed by the communication network 400A.

In some implementations, the mobile device 404 as shown in FIG. 4A is a remote device that can be linked to the cloud computing system 406, and can enable a user to provide inputs on the mobile device 404. The mobile device 404 can include user input elements such as, for example, one or more of a touchscreen display, buttons, a microphone, a mouse, a keyboard, or other devices that respond to inputs provided by the user. The mobile device 404 alternatively or additionally includes immersive media (e.g., virtual reality) with which the user interacts to provide a user input. The mobile device 404, in these cases, is, for example, a virtual reality headset or a head-mounted display. The user can provide inputs corresponding to commands for the mobile device 404. In such cases, the mobile device 404 can transmit a signal to the cloud computing system 406 to cause the cloud computing system 406 to transmit a command signal to the mobile robot 100. In some implementations, the mobile device 404 can present augmented reality images. In some implementations, the mobile device 404 is a smart phone, a laptop computer, a tablet computing device, or other mobile device.

According to various examples discussed herein, the mobile device 404 can include a user interface configured to display a map of the robot environment. Robot path, such as that identified by the coverage planner of the controller circuit 303, can also be displayed on the map. The interface can receive a user instruction to modify the environment map, such as by adding, removing, or otherwise modifying a keep-out traversable zone in the environment; adding, removing, or otherwise modifying a duplicate traversal zone in the environment (such as an area that requires repeated cleaning); restricting a robot traversal direction or traversal pattern in a portion of the environment; or adding or changing a cleaning rank, among others.

In some implementations, the communication network 400A can include additional nodes. For example, nodes of the communication network 400A can include additional robots. Alternatively or additionally, nodes of the communication network 400A can include network-connected devices. In some implementations, a network-connected device can generate information about the environment. The network-connected device can include one or more sensors to detect features in the environment, such as an acoustic sensor, an image capture system, or other sensor generating signals from which features can be extracted. Network-connected devices can include home cameras, smart sensors, smart locks, smart thermostats, smart garage door openers, and the like.

In the communication network 400A depicted in FIG. 4A and in other implementations of the communication network 400A, the wireless links can utilize various communication schemes, protocols, or the like, such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, 4G, 5G, or the like. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA.

Figure 4B:
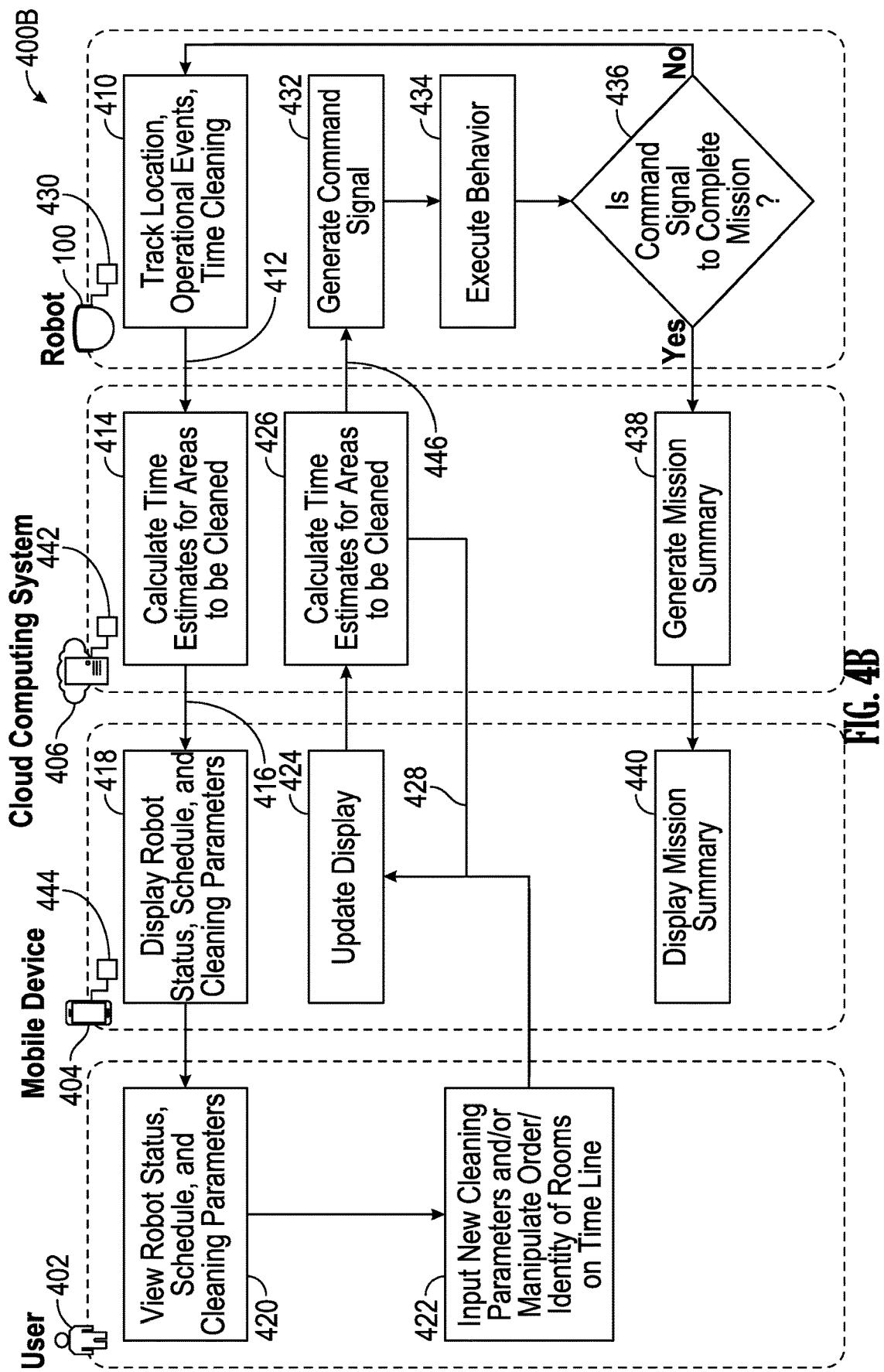
FIG. 4B illustrates a diagram illustrating an exemplary process of exchanging information between the mobile robot and other devices in a communication network.

FIG. 4B is a diagram illustrating an exemplary process 400B of exchanging information among devices in the communication network 400A, including the mobile robot 100, the cloud computing system 406, and the mobile device 404. A cleaning mission can be initiated by pressing a button on the mobile robot 100 or can be scheduled for a future time or day. The user can select a set of rooms to be cleaned during the cleaning mission, select a set of areas or zones within a room, or can instruct the robot to clean all rooms. The user can also select a set of cleaning parameters to be used in each room during the cleaning mission.

During a cleaning mission, the mobile robot 100 can track its status, including its location, any operational events occurring during cleaning, and a time spent cleaning 410. The mobile robot 100 can transmit status data 412 (e.g., one or more of location data, operational event data, time data) to a cloud computing system 406, which calculates, using a processor 442, time estimates for areas to be cleaned 414. For example, a time estimate could be calculated for a cleaning room by averaging actual cleaning times for the rooms that have been gathered during multiple (e.g., two or more) prior cleaning missions for the room. The cloud computing system 406 can transmit time estimate data along with robot status data 416 to a mobile device 404. The mobile device presents, using a processor 444, the robot status data and time estimate data 418 on a display. The robot status data and time estimate data can be presented on the display of the mobile device as any of a number of graphical representations editable mission timeline or a mapping interface. In examples, the mobile robot 100 can communicate directly with the mobile device 404.

A user 402 can view 420 the robot status data and time estimate data 420 on the display and can input new cleaning parameters or can manipulate the order or identity of rooms to be cleaned 422. The user 402, may, for example, delete rooms from a cleaning schedule of the mobile robot 100. In other instances, the user 402, may, for example, select an edge cleaning mode or a deep clean mode for a room to be cleaned. The display of the mobile device 404 is updated 424 as the user inputs changes to the cleaning parameters or cleaning schedule. For example, if the user changes the cleaning parameters from single pass cleaning to dual pass cleaning, the system will update the estimated time to provide an estimate based on the new parameters. In this example of single pass cleaning vs. dual pass cleaning, the estimate would be approximately doubled. In another example, if the user removes a room from the cleaning schedule, the total time estimate is decreased by approximately the time needed to clean the removed room. Based on the inputs from the user 402, the cloud computing system 406 calculates time estimates 426 for areas to be cleaned, which are then transmitted 428 (e.g., by a wireless transmission, by applying a protocol, by broadcasting a wireless transmission) back to the mobile device 404 and displayed. Additionally, data relating to the calculated time estimates 426 are transmitted 446 to a controller 430 of the robot. Based on the inputs from the user 402, which are received by the controller 430 of the mobile robot 100, the controller 430 generates a command signal 432. The command signal commands the mobile robot 100 to execute 434 a behavior, which can be a cleaning behavior. As the cleaning behavior is executed, the controller continues to track the robot's status, including its location, any operational events occurring during cleaning, and a time spent cleaning 410. In some instances, live updates relating to the robot's status can be additionally provided via push notifications to a mobile device or home electronic system (e.g., an interactive speaker system).

Upon executing a behavior 434, the controller 430 can check 436 to see if the received command signal includes a command to complete the cleaning mission. If the command signal includes a command to complete the cleaning mission, the robot can be commanded to return to its dock and upon return sends information to enable the cloud computing system 406 to generate a mission summary 438 which can be transmitted to, and displayed 440 by, the mobile device 404. The mission summary can include a timeline or a map. The timeline can display, the rooms cleaned, a time spent cleaning each room, operational events tracked in each room, or the like. The map can display the rooms cleaned, operational events tracked in each room, a type of cleaning (e.g., sweeping or mopping) performed in each room, or the like.

Operations for the process 400B and other processes described herein can be executed in a distributed manner. For example, the cloud computing system 406, the mobile robot 100, and the mobile device 404 can execute one or more of the operations in concert with one another. Operations described as executed by one of the cloud computing system 406, the mobile robot 100, and the mobile device 404 are, in some implementations, executed at least in part by two or all of the cloud computing system 406, the mobile robot 100, and the mobile device 404.

Examples of Robot Scheduling and Controlling System

Various examples of systems, devices, and processes of scheduling and controlling a mobile robot based on user location, behavior, and experience are discussed in the following with reference to FIGS. 5A-5B. While this document makes reference to the mobile robot 100 that performs floor cleaning, the robot scheduling and controlling system and methods discussed herein can be used in robots designed for different applications, such as mopping, mowing, transporting, surveillance, among others. Additionally, while some components, modules, and operations can be described as being implemented in and performed by the mobile robot 100, by a user, by a computing device, or by another actor, these operations may, in some implementations, be performed by actors other than those described. For example, an operation performed by the mobile robot 100 can be performed by the cloud computing system 406 or by another computing device (or devices). In other examples, an operation performed by the user can be performed by a computing device. In some implementations, the cloud computing system 406 does not perform any operations. Rather, other computing devices perform the operations described as being performed by the cloud computing system 406, and these computing devices can be in direct (or indirect) communication with one another and the mobile robot 100. In some implementations, the mobile robot 100 can perform, in addition to the operations described as being performed by the mobile robot 100, the operations described as being performed by the cloud computing system 406 or the mobile device 404. Other variations are possible. Furthermore, while the methods and processes described herein are described as including certain operations or sub-operations, in other implementations, one or more of these operation or sub-operations can be omitted, or additional operations or sub-operations can be added.

Figure 5A:
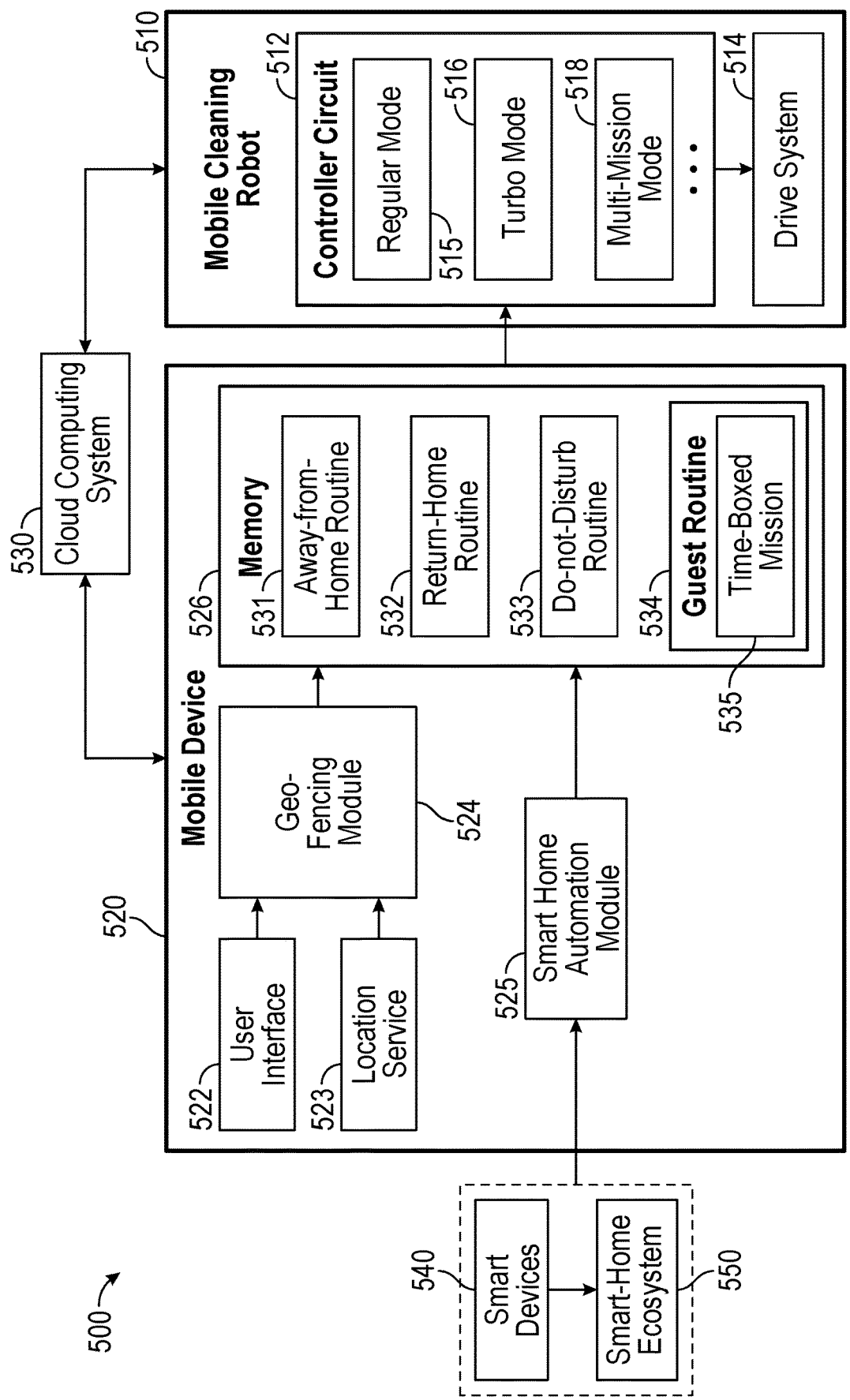
FIG. 5A illustrates a diagram illustrating an example of automatic mission scheduling and robot control.

FIG. 5A is a diagram illustrating an example of a mobile robot system 500 for automatic mission scheduling and robot control based on user location, user behavior, or contextual information. The mobile robot system 500 can include a mobile cleaning robot 510 and a mobile device 520 operatively in communication with the mobile cleaning robot 510. In examples, the mobile cleaning robot 510 can communicate with the mobile device 520 through a cloud computing system 530, which can be an embodiment of the cloud computing system 406 as discussed above with reference to FIGS. 4A-4B.

The mobile cleaning robot 510, which can be an example of the mobile robot 100, can include, among other things, a controller circuit 512 and a drive system 514. The controller circuit 512 can receive information about user location, user behavior, or contextual information such as a temporal context. Based on the received user location, behavior, or the contextual information, the controller circuit 512 can generate a mission control signal to navigate the mobile cleaning robot 510 to conduct a mission in the environment. The mission, as to be discussed below, can be scheduled in reference to user location, behavior, or the contextual information. Such a mission scheduling process can be referred to scheduling by automation, such as to distinguish from time-based scheduling where the mission or the tasks therein are scheduled to happen at respective times.

The mobile device 520, which can be an embodiment of the mobile device 404, can be configured to schedule one or more missions, and to command the mobile cleaning robot 510 to execute such missions according to the respective schedules. Examples of the mobile device 520 can include a smart phone, a personal digital assistant, a laptop computer, a tablet, a smart watch, or other portable computing device. In examples, the mobile device 520 can schedule missions for, and control the operations of, two or more mobile robots of the same or different types, such as mobile cleaning robots, mobile mopping robots, lawn mowing robots, space-monitoring robots, among others, using the techniques as described herein in accordance with various examples.

The mobile device 520 can include a user interface 522 that allows a user to create or modify one or more mission routines such as, by way of example and not limitation, an Away-From-Home Routine 531, a Return-Home Routine 532, a Do-Not-Disturb Routine 533, or a Guest Routine 534, as illustrated in FIG. 5A. A routine is a cleaning mission comprising one or more tasks to perform, or to refrain from performing, by the mobile robot. A routine can additionally include information about locations to clean (e.g., one or more rooms or specific zones), manners of cleaning (e.g., cleaning modes), and schedules for performing the mission (e.g., time schedules, or events and conditions that trigger the execution of the mission), among others. The mission routines can be stored in a memory 526 of the mobile device 520. Alternatively, the mission routines can be stored in the cloud computing system 530 accessible by the mobile device 520.

The mobile device 520 can run a software application implemented therein (e.g., a mobile application) or a web-based service (e.g., services provided by the cloud computing system 530) to assist the user in creating or modifying the mission routines. In examples, such a software application or web-based service can use "If This Then That" (IFTTT) technology that connects different applications, devices, or services in order to trigger one or more automations involving those applications, devices and services. A user can create, via the user interface 522, one or more mission routines using the IFTTT service. A mission routine thus created can include a set of conditional cleaning tasks that can be triggered by certain events or user behaviors, which can be detected or otherwise received by the mobile device 520. For example, the Away-From-Home Routine 531 can include a mission triggered by an indication that the user leaves home (e.g., "Clean the living room and kitchen when I am away."). The Return-Home Routine 532 can include a mission triggered by an indication that the user arrives, or is about to arrive, at home (e.g., "Stop cleaning and return to dock when I am returning home."). The Away-From-Home Routine 531 and the Return-Home Routine 532 are referred to as home-centric routines in this document. The Do-Not-Disturb Routine 533 can include a mission or specific robot actions that the mobile cleaning robot 510 refrains from performing, or temporary suspension, pause, or postponement of an unfinished cleaning mission. In examples, a user can schedule a Do-Not-Disturb Routine by specifying a "No-Run Time". Alternatively, the Do-Not-Disturb Routine can be conditional upon a specific user behavior (e.g., "Do not clean when I am in a phone call", or "Stop cleaning when I turn on my smart TV", or "Do not mow when my dog is in the yard."). The Guest Routine can include a mission to be performed during a pre-set time period which, in examples, can be shorter than that generally needed to complete the entire mission when the mobile robot operates in its typical cleaning mode. In examples, the Guest Routine can include a time-boxed mission including one or more areas to be cleaned during the pre-set time window, which can be programmable or selectable by a user via a user interface of the mobile device. The IFTTT service allows different mobile applications and different devices to be connected together, and enables conditional mission operation on the mobile robot.

Home-Centric Mission Scheduling Based on Geofencing

Home-centric routines, such as the Away-From-Home Routine 531 and the Return-Home Routine 532, are based on a reliable detection or validation of the user being away from home or returning home. This can be detected or determined using one of several techniques, as discussed herein in accordance with various examples. In examples, the mobile device 520 can include a location service 523 and a geofencing module 524 that can detect when the user is away from home or returns home. The user interface 522 can include a display unit with input tools (e.g., UI controls) to allow a user to define a geographical zone with respect to the user's residence location, to display a map showing the defined geographical location of the user's residence, and. Such a geographic zone, also referred to as a geofence, defines virtual boundaries around the user's residence location. The location service 523 can utilize GPS, RFID, Wi-Fi or cellular data to determine a present location of the mobile device 520. As the mobile device 520 is generally held by or otherwise associated with the user, the user's location can be inferred to be substantially the same as the location of the mobile device 520. The geofencing module 524, which can be a software implemented in and executable by the mobile device 520 (e.g., a mobile application), can detect an indication of the user entering or exiting the geofence based on the present geographical location of the mobile device 520. In the case of multiple users in a household, the settings can be configured to detect when the last person's phone leaves the defined geographical location of the residence.

The controller circuit 512 of the mobile cleaning robot 510 can receive the indication of the user entering or exiting the geofence around the user's residence location from the mobile device 520, such as via a direct communication link or through the cloud computing system 530. The controller circuit 512 can generate a mission control signal to the drive system 514 to move the mobile cleaning robot 510 to the environment of the user's residence, and conduct a mission in accordance with a mission routine. For example, an indication of the mobile device 520 exiting the geofence (indicating the user is away from home) can automatically trigger the mobile cleaning robot 510 to execute the Away-From-Home Routine 531. An indication of the mobile device 520 entering the geofence (indicating the user is returning home) can automatically trigger the mobile cleaning robot 510 to execute the Return-Home Routine 532, such as aborting, suspending, pausing, postponing, or rescheduling the unfinished mission when or before the user arrives at home. In examples, an indication of the user entering the geofence can automatically trigger the mobile cleaning robot 510 to return to a designated dock station. In another example, an indication of the user entering the geofence can automatically trigger the mobile cleaning robot 510 to continue cleaning and finish the present mission. In examples, in response to the indication of the user entering the geofence, the mobile robot can continue the presently unfinished mission for a specific time based on an estimated time of completing the mission or a portion thereof. For example, if the mobile robot is in the middle of cleaning a room as a part of the scheduled mission when the user enters the geofence, the mobile robot can estimate the time to complete the present room and the time to complete the entire mission. If the estimated time of completion is within a specific range or less than a specific threshold time (e.g., 5 minutes), the mobile robot can continue to clean and finish the present task (e.g., the room left unfinished) or the entire mission within the estimated time. In yet another example, in response to an indication of the user entering the predefined geographical zone, a notification can be generated to the user (e.g., displayed on the user interface 522), and prompt the user for a command with regard to an unfinished mission. The user can choose to continue cleaning, cancel the remaining job of the mission, and send the mobile robot home to its dock station, or postpone the presently unfinished mission to a subsequently scheduled time, including the next time the user leaves the defined geofence around the residence.

Home-Centric Mission Scheduling Based on Home Automation Devices and System

In addition to, or in lieu of, determining the user being away from home or returning home based on the location and geofencing services, in examples, one or more mission routines (e.g., Away-From-Home Routine 531 or the Return-Home Routine 532) can be triggered by internet-connected devices associated with the user's residence. The internet-connected devices, also referred to as smart devices, smart home devices, or Internet-of-Things (IoT) devices, are devices (or hardware in general) capable of transmitting data (e.g., sensor data) from one place to another over the Internet. Examples of the smart devices include smart speakers, smart thermostats, smart lighting, smart lock, smart garage door, smart plugs, smart TVs, smart toys, wearables, smart air conditioning, and other smart appliances. A smart home is a residence that uses internet-connected devices to enable remote monitoring and management and creation of automated routines. Depending on the specific IoT application deployed, various networking, communication, and connectivity protocols can be used with the internet-enabled devices, including, for example, CoAP, DTLS and MQTT, among others. Wireless protocols include IPv6, LPWAN, Zigbee, Bluetooth Low Energy, Z-Wave, RFID, cellular, satellite, Wi-Fi, and Ethernet, among others.

As illustrated in FIG. 5A, the mobile device 520 can include a smart home automation module 525 (such as a software package or a mobile application) operatively in communication with one or more smart devices 540. The home automation module 525 can use an IFTTT technology to enable the mobile cleaning robot 510 to seamlessly connect to a wide range of different services supported by the robot control application on the mobile device 520, as well as from the broader IFTTT-enabled smart home ecosystem. In a way, IFTTT can work as a matchmaker between the mobile robot 510 and other smart home devices 540 or smart home ecosystem 550 and services, such that they can work together to accomplish conditional cleaning. For example, the mobile robot 510 can be programmed to start cleaning after one or more triggers indicate that the user is away from home. For example, a trigger can be sent to the mobile robot when a smart front door lock is locked, or when a smart thermostat detects that the user is away from home, or when a smart garage door is closed.

The one or more smart devices 540 can change their respective device operating states when the user enters or exits the user's residence. The smart home automation module 525 can detect the device operating states or changes thereof and determine an occurrence of the user entering or exiting the home. Such information about user entering or exiting the residence can be received by the mobile cleaning robot 510, and the controller circuit 512 can generate a mission control signal to the drive system 514 to navigate the mobile cleaning robot 510 in the environment and conduct a mission, such as the Away-From-Home Routine 531 in response to one or more smart devices changing their respective operating states indicating the user exiting the home, or the Return-Home Routine 532 in response to one or more smart devices changing their respective operating states indicating the user entering the home. For example, a smart lock that locks the front door, a smart garage that closes the garage door, or a smart thermostat operates on a preset "Away" room temperature, can indicate the user being away from home, which in turn can trigger the controller circuit 512 to generate a control signal to initiate execution of the Away-From-Home Routine 531. Conversely, a smart lock that unlocks the front door, a smart garage that opens the garage door, or a smart thermostat that sets to a preset "Home" room temperature, can indicate the user returning home, which in turn can trigger the controller circuit 512 to generate a control signal to initiate execution of the Return-Home Routine 532, such as to stop cleaning and return to the dock, or to prompt the user for an action with regard to an unfinished mission. The user can have the option to define when the trigger takes action to start or end the mobile robot cleaning mission, such as only on specific days, between specific time windows, and frequency (e.g., only once per day).

In examples, one or more of the smart devices 540 can be networked and managed by a smart home ecosystem 550. A smart home ecosystem, also referred to as a home automation ecosystem, can include a virtual assistant (the artificial intelligence (AI) service capable of communicating with a user), a speaker (hardware), and a software such as a mobile application run on a mobile device (e.g., a mobile phone or a tablet). One or more smart devices can be configured to pair with the smart home ecosystem and controlled by the software or mobile application on the mobile device. A smart home ecosystem comprises of different networks, including Artificial Intelligence (AI), Internet of Things (IoT) and cloud services, which make the networked devices work smartly. Compared to independent control of different smart devices, a smart home ecosystem gives a user the ability to control multiple networked smart devices (e.g., internet-connected windows, doors, lighting, security, thermostat, home appliance) with one interface. Examples of the smart home ecosystems include any smart home ecosystems.

The smart home ecosystem 550 can generate alerts to a user when a connected smart device changes its operating state. The alerts can be voice alerts or push notifications on the user interface 522 of the mobile device 520, among other forms of notification. In examples, based on a change in operating states of one or more networked smart devices, the smart home ecosystem can detect an indication of the user entering or exiting the user's residence. Such information about user entering or exiting the residence can be transmitted to the mobile cleaning robot 510, and the controller circuit 512 can generate a mission control signal to navigate the mobile cleaning robot 510 to conduct a mission, such as the Away-From-Home Routine 531 in response to an indication of the user exiting the home, or the Return-Home Routine 532 in response to an indication of the user entering the home, as discussed above.

In examples, the smart home ecosystem 550 can include a voice-controlled home assistant device configured to receive a voice command of the user to conduct the mission (e.g., "Clean the kitchen."). The voice-controlled home assistant device can include a smart speaker of the smart home ecosystem as discussed above. Examples of the voice-controlled home assistant devices (or the smart speakers) include any home assistant devices, or smart home ecosystems. The voice-controlled home assistant device can be paired with the mobile cleaning robot 510 and controlled by the mobile device 520. The voice-controlled home assistant device can be trained to recognize the user's voice command, interpret the voice command using a voice interpretation service (e.g., in the cloud computing system 530), and send a control signal to the mobile robot 510. The controller circuit 512 can generate a mission control signal to the drive system 514 to navigate the mobile cleaning robot 510 to conduct a mission in accordance with the user's voice command.

Do-Not-Disturb Routine

The Do-Not-Disturb Routine 533 can include a mission represented by a time period during which the mobile cleaning robot 510 is refrained from executing a mission or performing certain robot actions or making sounds, or temporary suspension, pause, or postponement of an unfinished cleaning mission. A user can create a "No-Run Time" (NRT) schedule, such as a time period on a specific day or days during which the mobile robot can refrain from conducting any mission, a particular type of mission, certain robot actions, or taking actions on any smart home ecosystem trigger. In examples, two or more distinct NRT schedules with respective time windows can be created and stored in the memory 526. In examples, the user can set up a NRT for every weekday between 10:00 p.m. and 7:00 a.m. when the household is sleeping, or on one specific day when guests come over between 5:00 p.m. or 10:00 p.m., or when a user is away from home for an extended period of time (e.g., vacation) and wants peace of mind that their mobile robot will absolutely not respond to any automated smart home triggers or routines or pre-defined time-based schedules. A user can create any NRT schedule that works for their life and provide respective descriptive labels for the distinct NRT schedules, such as Quiet Time, Sleep Time, Nap Time, Meal Time, TV Time, Work Time, Meeting Time, Guest Time, Vacation Mode or the like. The mobile device UI can offer the user pre-populated, and even personalized, suggestions for specific NRT schedules that the user can toggle on, customize, or delete, based on their routines and cleaning habits. In one example, if the user cancels a cleaning mission starting at a certain time frequently, they can be recommended a personalized NRT schedule during the time in which they frequently cancel missions. The controller circuit 512 can generate a mission control signal to suspend or pause a mission during the time window as specified in the NRT schedule.

As an alternative or in addition to the scheduled NRT, the suspension or pause of a mission can be triggered by a detection, or a received indication, of a specific trigger event or user behavior. Examples of the trigger event can include a doorbell ring, a phone ring, a calendar event, the baby monitor turning on, or user engagement in an audio-sensitive event such as attending a meeting, watching TV, listening to music, or having a conversation. In examples, a trigger event can be detected automatically based on respective operating states (or respective changes in operating state) of one or more of internet-connected devices, such as the smart devices 540 associated with the user's residence, that can be communicatively coupled to the mobile cleaning robot 510. For example, a smart phone, upon detecting a phone ring or an incoming phone call, can send a signal to the mobile cleaning robot 510, triggering the controller circuit 512 to execute the Do-Not-Disturb Routine 533 by suspending or pausing the mobile cleaning robot 510 from cleaning the environment for as long as the smart phone detects that the user remains on the phone. In another example, a smart TV, upon detecting it is being turned on, can send a signal to the controller circuit 512 to execute the Do-Not-Disturb Routine 533 to suspend or pause the cleaning mission for as long as the smart TV remains on. In another example, a smart doorbell, when activated, can send a signal to the controller circuit 512 to execute the Do-Not-Disturb Routine 533 to suspend or pause the cleaning mission temporarily for as long as a smart door detects a door being unlocked. The controller circuit 512 can pause the mission, or modify the mission routine such as by rescheduling or postponing the task that interferes with the audio-sensitive event until the audio-sensitive event is over, or as instructed by a user.

In examples, the Do-Not-Disturb Routine 533 can include suspension or pause of a particular robot action or sound, or a particular task of a mission. Certain robot actions, such as auto-evacuation of collected debris into a receptacle of a dock, cleaning on certain floor types or floor conditions (e.g., edges of a carpeted area), or certain cleaning modes (e.g., deep cleaning), can produce loud noise interfering with user's activities in the environment, such as audio-sensitive activities. In alternative to suspending the entire mission, in examples, the Do-Not-Disturb Routine 533 can include suspension or pause of certain robot actions or sounds, or avoidance of certain floor conditions or certain cleaning modes, that would normally produce loud noise. As discussed above, the suspension or pause can be based on time (such as an NRT schedule) or triggered by a trigger event or user behavior. Accordingly, the Do-Not-Disturb Routine 533 can include, for example, "Do not auto-evacuate after 9:00 p.m. when I am sleeping", "Do not clean carpet 8:00-10:00 p.m.", "Do not auto-evacuate when I watch TV", or "Do not deep-clean when I am in a phone call", or the like. The user can specify that the mobile robot can proceed to clean at night but not run the auto-evacuation during this time. The controller circuit 512 can accordingly pause or suspend the corresponding robot action or cleaning activity at specified time or upon a detection of the specified trigger event. In examples, in accordance with the Do-Not-Disturb Routine 533, the controller circuit 512 can modify certain robot actions to reduce the noise produced, such as by reducing moving speed, reducing cleaning power, or the like.

In examples, the suspension or pause of a mission can be triggered by a room occupancy state, which indicates a presence or absence of a person in a room. A user can create a Do-Not-Disturb Routine 533 such as "Do not clean the kitchen when someone is there." The room occupancy can be detected automatically based on respective operating states (or respective changes in operating state) of one or more of internet-connected devices, such as the smart devices 540 associated with the user's residence, that are communicatively coupled to the mobile cleaning robot 510. Examples of the smart device for this purpose can include a smart security camera or a smart speaker in the room. Alternatively, the room occupancy can be detected by a camera or other sensors on a mobile robot. The controller circuit 512 can accordingly pause or suspend the mission, or reorder cleaning order of rooms, upon a detection of the room being occupied, or modify the mission routine, such as by postponing the task scheduled to be performed in the occupied room until it is no longer occupied, or as instructed by a user.

In accordance with the Do-Not-Disturb Routine 533, the mobile cleaning robot 510 can be unresponsive to a cleaning command. In examples, such a "no response" state can be overridden via the mobile device 520 (e.g., via the user interface and through the mobile application), voice control, or directly on the cleaning robot 510. Both the mobile device UI and the smart speaker can provide the user with reminders and warnings if the home is in a designated Do-Not-Disturb Routine and offer users an option to override the NRT. In examples, a push notification or an alert can be generated and presented to the user (such as via the mobile device 520) to indicate the Do-Not-Disturb Routine 533 is about to begin, or about to end, such as approaching the end of the time window for No-Run Time, or a termination of the trigger event (e.g., end of a phone call, smart TV turning off). The user can use UI controls on the user interface 522 to confirm, reject, or modify the Do-Not-Disturb Routine. While the user can still press the mobile robot's physical button to start cleaning during an NRT, the user can have an option in the mobile device UI to also disable this physical button as an extra precaution. The user can have the option in the mobile device UI to disable other robot sounds or voices as part of a Do-Not-Disturb Routine such as error messages or location.

The controller circuit 512 can resume the mission at the expiration of the "No-Run Time", or in response to an indication that the condition that triggers the Do-Not-Disturb Routine 533 is no longer satisfied (e.g., the audio-sensitive event ends, or the room is no longer occupied), or as instructed by a user. In examples, the controller circuit 512 can operate the mobile cleaning robot 510 in a multi-mission mode 518. This can allow the mobile cleaning robot to complete a cleaning mission in multiple separate sessions at different times, such as a series of time windows over a specified number of days (e.g., 3 days or 7 days). The controller circuit 512 can track the progress of the mission including a mission completion status, such as areas that have been cleaned, or areas left unfinished such as due to "No-Run Time" or "Do-Not-Disturb" routines, or a routine with time constraints (e.g., time-boxed mission 535 as to be discussed in the following). At the end of the "Do-Not Disturb" period, the controller circuit 512 can trigger the mobile cleaning robot to resume the unfinished job immediately or postpone the unfinished job to a subsequently scheduled time window. Notification including a summary of coverage of the mission across different time windows, along with other metrics, can be displayed to the user. In examples, suggestions such as adjusting the multi-mission schedule for future time windows over a specified number of days can be presented to the user.

Guest Routine with Time-Boxed Mission

The Guest Routine 534 can include a mission to be performed during a pre-set time period which, in examples, can be shorter than that generally needed to complete the entire mission when the mobile robot operates in its typical cleaning mode (e.g., the mobile robot moves at normal speed, cleans using uniformly the full cleaning power, and cleans all reachable floor surfaces of the areas as specified by the mission.) Such a mission constrained by time is also referred to as a time-boxed mission 535. In contrast to some cleaning missions purported to maximize the amount of dirt or debris removed, one objective of the Guest Routine 534 is to maximize the visible area cleaned under the time constraint. For example, in a scenario where a cleaning is to be performed before a guest coming in 30 minutes (and thus the name "Guest Routine"), the goal of cleaning is to have only those visible areas look clean. The mobile cleaning robot need not clean areas invisible or less-observable to the guest, but can instead prioritize the visible areas, such as large open spaces that guests would see and where they can notice visible dirt.

The time-boxed mission 535 can be created or modified by the user via the user interface 522. For example, the user can define a time window by providing a beginning time and an end time. Alternatively, the user can provide a time duration (time window) for the time-boxed mission 535, such as, by way of example and not limitation, a 15-minute window, a 30-minute window, or a 45-minute window. In examples, a user can make a selection from a pre-populated plurality of time windows for the time-boxed mission 535. Other time durations can be provided or selected by the user. In examples, a user can create time-boxed missions for one or more user-specified days with respective pre-set time windows, such as a 30-minute time-boxed mission each day from Monday through Thursday, and a 45-minute time-boxed mission each day Saturday and Sunday.

Although the time-boxed mission 535 is discussed herein in association with the Guest Routine 534, this is provided as an example but not limitation. In examples, the time-boxed mission 535 can be combined with other routines, such as Away-From-Home Routine 531, Return-Home Routine 532, or Do-Not-Disturb Routine 533, among others. Examples of such routines can include, for example, "Start clean when I leave home, for 30 minutes", or "Start clean for 10 minutes before I return home."

The time-boxed mission 535 include one or more areas to be cleaned during the pre-set time window. A user can specify or select, via the user interface 522, one or more areas to be included in the time-boxed mission 535. An example of the time-boxed mission 535 thus created can be represented by "Clean the kitchen and dining rooms in 15 minutes." In examples, the mobile cleaning robot 510 can dynamically determine one or more areas to be included in the time-boxed mission 535 based on respective estimated time of completion (ETC) of cleaning respective areas. For example, if a 15-minute window is selected for the time-boxed mission 535, and that the ETC's (such as based on previous cleaning experience) are 8 minutes to clean the kitchen, 6 minutes to clean the dining room, and 20 minutes to clean the living room, then the mobile robot would include only the kitchen and the dining room into the time-boxed mission 535 to fit into the 15-minute time window.

The time-boxed mission 535, if defined by user-specified beginning and end times, can be initiated based on time. Alternatively, the time-boxed mission 535 can be initiated by a user command, such as via a mobile application through the user interface 522 or a voice command. In examples, the time-boxed mission 535 can be initiated by a trigger event. An example of the trigger event is an indication of the user entering or exiting a pre-defined geographical zone with respect to a location of user's residence. As discussed above with reference to Away-From-Home Routine 531 and the Return-Home Routine 532, the state of the user being away from home or returning home can be detected or validated using the location service 523 and the geofencing module 524. An example of the time-boxed mission 535 thus created can be represented by, "Start cleaning when I am away, but finish the cleaning in 30 minutes." In response to an indication of the mobile device 520 exiting the geofence (indicating the user is away from home), the mobile cleaning robot 510 can be automatically activated to execute the time-boxed mission 535 of the Guest Routine 534. Alternatively, the mobile cleaning robot 510 can be triggered to execute the time-boxed mission 535 in response to an indication of the mobile device 520 entering the geofence (indicating the user is returning home). Another example of the trigger event to initiate the time-boxed mission 535 can include a detection of a specific user behavior such as detected by one or more internet-connected devices associated with the user's residence, as discussed above with reference to Away-From-Home Routine 531 and the Return-Home Routine 532.

A user can provide a name or identifier for the Guest Routine 534, such as "Quick Clean Routine", "30-minute Pre-party routine", or the like. The created Guest Routine 534 can be stored in a memory 526 of the mobile device 520. Alternatively, the mission routine can be stored in the cloud computing system 530 accessible by the mobile device 520.

Because the time-boxed mission 535 of the Guest Routine 534 is constrained by a generally short time window, the mission can be left unfinished at the expiration of the time window, particularly if the mobile robot is set to clean large floor areas or if the mobile robot operates in its regular mode 515. In certain occasions, it can be desirable to avoid or reduce the chance of mission incompleteness, and to maximize the mission completion rate. The controller circuit 512 of the mobile cleaning robot 510 may, automatically or in response to a user instruction, operate the mobile cleaning robot in one of several different modes, including, for example, a regular mode 515, a turbo mode 516, or a multi-mission mode 518, among others. The regular mode 515 refers to a full and thorough clean of designated areas with a regular traversing speed and a regular cleaning power. In contrast to the regular mode 515, the turbo mode 516 refers to quick or prioritized cleaning, such as due to a time constraint (e.g., the time-boxed mission 535), at the expense of cleaning thoroughly. The multi-mission mode 518 refers to scheduling a mission into multiple sessions separate in time. Although the turbo mode 516 is discussed herein in association with the time-boxed mission 535 of the Guest Routine 534, this is provided as an example but not limitation. In examples, the turbo mode 516 can be used with other mission routines, such as Away-From-Home Routine 531, Return-Home Routine 532, or Do-Not-Disturb Routine 533, among others.

Figure 5B:
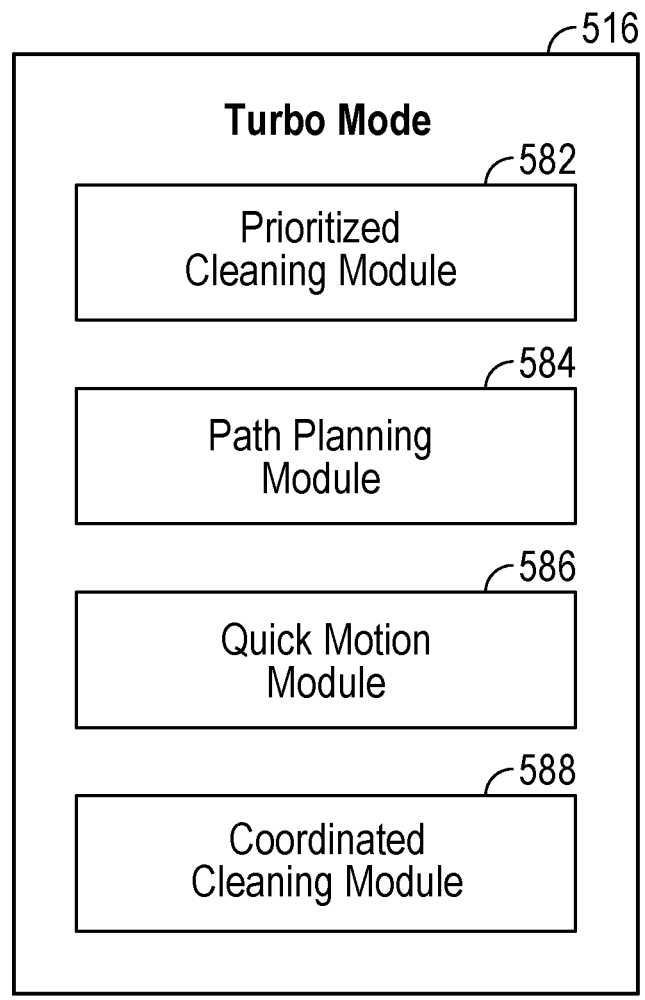
FIG. 5B illustrates a diagram illustrating an example of a turbo mode of cleaning that can be used by a mobile cleaning robot.

Referring to FIG. 5B, the turbo mode 516 can be enabled by one or more of a prioritized cleaning module 582, a planning module 584, a quick motion module 586, and a coordinated cleaning module 588. One or more of those modules, among others, can reduce mission operation time and avoid or reduce the chance of a unfinished mission such as the time-boxed mission 535. The prioritized cleaning module 582 can prioritize areas based on one or more floor conditions or properties, and the mobile robot can then generate a mission control signal to trigger the mobile cleaning robot to conduct the mission in accordance with the prioritized areas during the pre-set time window.

In examples, the prioritized cleaning module 582 can prioritize cleaning areas based on locations and observabilities thereof. As one objective of the Guest Routine 534 is to maximize the visible area cleaned, using the prioritized cleaning module 582 to identify and prioritize those visible areas (e.g., large open spaces where dirt, if any, is more noticeable) over invisible or less-observable areas (e.g., floor underneath furniture like couches, low tables, and beds; floor in closets, bedrooms, or other rooms or areas less likely be accessed by the guest) can reduce cleaning time and thus avoid an unfinished mission.

In examples, the prioritized cleaning module 582 can prioritize cleaning areas based on a spatial distribution of dirt detected in the one or more areas. The mobile robot can detect dirty areas in the environment and generate dirt detection events. The dirty areas can be detected based on images taken from an imaging sensor (e.g., a front-facing camera) on the mobile robot, or from an external camera associated with the environment. In examples, the external camera can be an internet-connected smart camera in communication with the mobile cleaning robot 510 and the mobile device 520. The external camera that is mounted higher up in a room can provide better information about what parts of the environment look dirty from a higher vantage point. The external camera can also provide a real-time map of the environment of a portion thereof without the mobile cleaning robot needing to travel around the house, making it easier to prioritize cleaning areas based on dirt conditions therein.

The mobile robot can prioritize dirtier areas over less dirty areas. In some examples, a heatmap of dirtiness representing a spatial distribution of the dirt detection events across the one or more areas can be generated. Based on the heatmap of dirtiness, the mobile robot can prioritize areas that are more frequently cleaned or more heavily cleaned over less-frequently cleaned or less-heavily cleaned areas.

In examples, the prioritized cleaning module 582 can prioritize cleaning areas based on floor types thereof. Certain floor types (the "dirt-hiding" floor types, e.g., thick carpets) are more likely to disguise dirt or debris that other floor types (the "dirt-revealing" floor types, e.g., hardwood floor or short carpets). When different floor types are involved in the one or more areas of the time-boxed mission 535, the mobile robot can prioritize the dirt-revealing floor types over the dirt-hiding floor types when performing the time-boxed mission 535.

In examples, the prioritized cleaning module 582 can prioritize cleaning areas based on floor colors thereof. For example, light-colored floors can have high contrast even under low lighting conditions, which makes dirt or debris more visible than dark-colored floors with low contrast. When floors of different colors are involved in the one or more areas of a cleaning mission (e.g., the time-boxed mission 535), the prioritized cleaning module 582 can prioritize the light-colored floor over the dark-colored floor types such that the light-colored floors get cleaned before the dark-colored floors.

The path planning module 584 can identify one or more avoidance spots in the one or more areas, such as a clutter or an obstacle therein. In some examples, information about the avoidance spots can be identified by a user on a map of the environment. The path planning module 584 can schedule a coverage path covering at least a portion of the one or more areas and to avoid the avoidance spots. The controller circuit 512 can navigate the mobile cleaning robot 510 to traverse the one or more areas in accordance with the scheduled coverage path to conduct the mission (e.g., the time-boxed mission 535).

The avoidance spots can additionally or alternatively include floor areas close to a wall. Cleaning areas close to the wall can cause the mobile robot to wall follow, during which the mobile robot can frequently adjust its heading to remain engaged with the wall, which can be time-consuming. Avoiding the wall areas can reduce the chance of wall following. Alternatively, additional sensors can be used to allow the mobile cleaning robot to stay close to the wall without constant heading adjustment.

The avoidance spots can include hazardous areas where the mobile robot likely gets stuck. Getting stuck during a mission and escaping therefrom can be time-consuming and reduce the chance of mission completion. For urgent time-boxed missions with a tighter time constraint (such as a shorter time window), avoiding hazards can substantially save time and improve mission execution efficiency. For example, although deeper and riskier clean of certain tough-to-clean areas can be desirable in general, a less aggressive and safer clean can be more suitable for turbo mode cleaning. Additionally, as the mobile robot can drive at a faster speed (e.g., enabled by the motion module 586 as discussed below) and thus a higher momentum in a turbo mode, thresholds in the environment can be less risky to cause robot to be stuck. However, wedge hazards can be more hazardous, because a faster robot can get wedged deeper into the hazard. Accordingly, in some examples, the path planning module 584 can schedule a coverage path such as to avoid wedge hazards, particularly if the mobile robot drives at a higher speed in a turbo mode.

The path planning module 584 can additionally schedule the coverage path with improved snaking patterns. A snaking pattern is a path comprising a set of linear path segments connected by a number of 180-degree turns (a change in direction of motion) therebetween. Moving in a snaking pattern can be faster than perimeter wall following. Various improvements of snaking patterns have been contemplated by the present inventors. In examples, the snaking pattern can be characterized by reduced number of 180-degree turns connecting linear path segments. When turning, the robot can bump an obstacle, stop, back up, and turn before it begins the next rank. This behavior is time consuming. By choosing snakes that minimize the number of turns, the snake cleaning rate can be increased for the turbo mode. In another example, the snaking pattern can be accompanied by faster turns between ranks. For example, the mobile cleaning robot can use a front-facing camera to detect obstacles before bumping them. In yet another example, the snaking pattern can include an increased rank width, such as enabled by a wider cleaning head. In another example, the snaking pattern can be characterized by a reduced overlap between adjacent ranks. By reducing the rank overlap, the mobile robot needs fewer ranks per snake and can have a faster cleaning rate. A mobile robot generally moves faster when traveling in a straight line than when making a turn, during which the mobile robot typically needs to decelerate before and accelerate after making the turn. Turn-minimizing or turn-reducing techniques and the resulting snaking patterns are discussed in U.S. Patent Application No. 20200089255, the entirety of which is hereby incorporated by reference. In some examples, the snaking pattern can include negative rank overlap, represented by a gap between ranks. The gap area can be left uncleaned or can be cleaned by side brushes that agitate dirt or debris therein and get picked up by the mobile robot. Snaking with negative rank overlap can substantially improve the cleaning rate without significantly affecting the appearance of cleanliness.

The quick motion module 586 can generate a control signal to the drive system 514 to move the mobile cleaning robot 510 at a speed based on the time allocated for the mission, such as boxed time for the time-boxed mission 535. In another example, the quick motion module 586 can generate a control signal to the cleaning system of the mobile robot to drive the motorized cleaning elements (e.g., actuator 116 driving the cleaning rollers 114 or the driving the side brush assembly 122, and a suction fan motor 316 powering the vacuum assembly 124) at a power based on the time allocated for the mission, such as boxed time for the time-boxed mission 535. For example, the driving speed of the mobile robot or the motor power driving the cleaning elements can be inversely proportional to the time allocated for the time-boxed mission 535, such that the mobile robot can operate at a higher driving speed or higher cleaning power under a tighter time constraint (e.g., a shorter time window).

Certain missions can require two or more mobile robots to perform their respective tasks sequentially or in an interleaved manner, as there will be precedence constraints between the robots. For example, a kitchen floor can be cleaned first by a mobile dry-cleaning robot (e.g., vacuum robot), followed by a mobile wet-cleaning robot (e.g., a mopping robot). Such a sequential cleaning by two mobile robots can be time consuming for a time-boxed mission. The coordinated cleaning module 588 can schedule coordinated cleaning between at least two mobile robots (or different cleaning modes in one mobile robot) to reduce the time for completing a mission, such as the time-boxed mission 535. The controller circuit 512 can navigate the mobile cleaning robot 510 to traverse the environment in accordance with the scheduled coordinated cleaning. In the above example of cleaning a kitchen using two mobile robots, the coordinated cleaning module 588 can generate a schedule to keep the dry-cleaning robot only on the floor areas that the wet-cleaning robot cannot clean. In examples, wet-cleaning robot can clean certain areas without first being cleaned by the dry-cleaning robot. The wet-cleaning robot's cleaning pad would likely collect more debris that the dry-cleaning robot would normally clean up. This can result in a broader coverage of areas being cleaned even if certain floor areas are not quite as clean. In examples, the coordinated cleaning module 588 can schedule for each robot respective areas to cover. In another example, as wet cleaning is generally slower than dry cleaning, the coordinated cleaning module 588 can generate a schedule to use only the dry-cleaning robot. In another example, front-facing camera (or a sensor underneath the robot) can be used to identify sticky spots on the floor that are difficult to be dry cleaned. In this case, the wet-cleaning robot can only be used to perform spot cleaning on the identified sticky spots, while the dry-cleaning robot picks up dry debris everywhere. To improve the efficiency of coordinated cleaning, various mobile robots (e.g., the dry-cleaning robot and the wet-cleaning robot) can communicate with each other. In examples, the various robots can be networked and managed by a smart home automation ecosystem. Improved coordination can help improve mission completion rate under time constraint. For example, a dry-cleaning robot need not waste time waiting for a wet-cleaning robot, or performing dry cleaning activity prematurely.

The turbo mode 516, as discussed above with reference to FIG. 5B, can improve the cleaning efficiency and help reduce the chance of mission incompletion by the end of the allocated time. Returning to FIG. 5A, at the expiration of the pre-set time window of the time-boxed mission 535, the controller circuit 512 can generate a mission control signal to trigger the mobile cleaning robot 510 to return to a dock, regardless of the mission completion status. In examples, the controller circuit 512 can track the progress of the mission including a mission completion status. If the mission is unfinished by the expiration of the time window, the controller circuit 512 can generate the mission control signal to trigger the mobile cleaning robot to abort, suspend, or pause the unfinished mission, or postpone the unfinished mission to a subsequently scheduled time.

Multi-Mission Mode

In some examples, the controller circuit 512 can operate the mobile cleaning robot 510 in a multi-mission mode 518. This allows the mobile cleaning robot 510 to schedule a cleaning mission across multiple sessions at different times, such as a series of time windows over a specified number of days (e.g., 3 days, 7 days). The controller circuit 512 can track a progress of the mission including a mission completion status, such as areas that have been cleaned, and areas left unfinished by the expiration of the time window. The controller circuit 512 can trigger the mobile cleaning robot to resume the unfinished mission at the next time window in accordance with the multi-mission schedule. By of way of example and not limitation, time-boxed mission 535 can be conducted under the multi-mission mode 518, such that the unfinished job at the expiration of a present time window can be automatically assigned to the next scheduled time window. The multi-mission mode 518 can similarly be used when the mobile robot conducts other mission or routines, such as the Away-From-Home Routine, the Return-Home Routine 532, or the Do-Not-Disturb Routine. Notifications such as a summary of coverage of the mission across different time windows, along with other metrics, can be displayed to the user. In some examples, suggestions such as adjusting the multi-mission schedule for future time windows over a specified number of days can be presented to the user.

Automatic Scheduling for Mobile Robots

Figure 6:
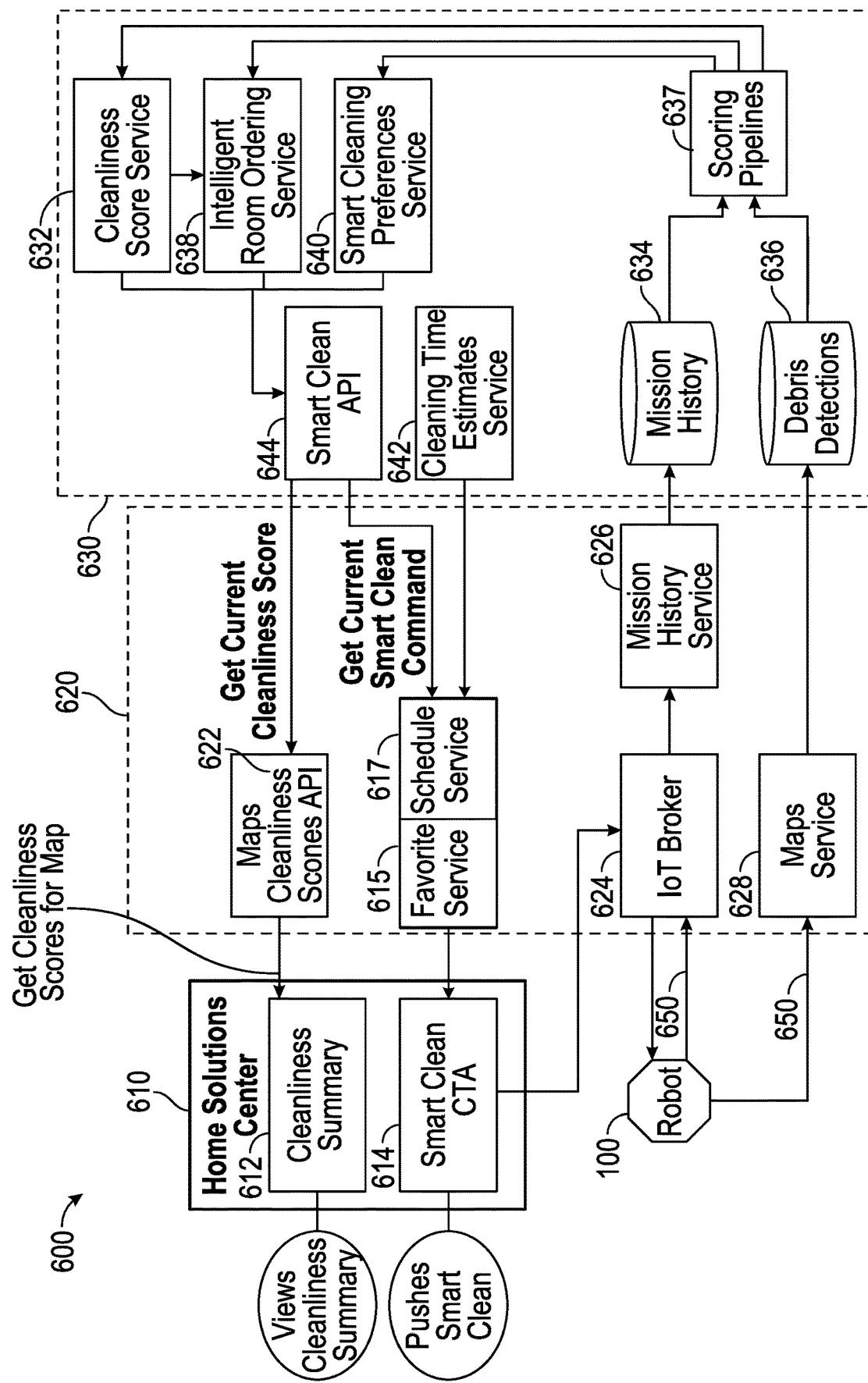
FIG. 6 illustrates a diagram illustrating an example of a system using a cleanliness score to prioritize cleaning by a mobile cleaning robot.

FIG. 6 is a diagram illustrating an example of a system 600 using a cleanliness score to prioritize cleaning by a mobile cleaning robot (e.g., the robot 100 (FIG. 1)). The system 600 can include multiple components in communication with one another. For example, as shown in FIG. 6, the system 600 can include a mobile component 610 (e.g., the mobile device 404 (FIG. 4A)), an internet of things (IoT component 620) (e.g., cloud computing system 406 (FIG. 4A)), and a data platform component 630 (e.g., robot 408 (FIG. 4A), any other device connected to the mobile component 610 or the IoT component 620, or the like.

The mobile component 610 can enable communication between a user (e.g., the user 60 (FIG. 1)) and the robot (e.g., the robot 100). A user can interface with the mobile component 610 to view a cleanliness summary 612 and to activate the smart clean call to action (CTA) or smart clean command 614. The mobile component 610 can generate the cleanliness summary 612 and transmit the smart clean command 614 to the IoT component 620. The user can also select one or more preferences, parameters, or controls to aid the system 600 in the scheduling and prioritizing of room cleaning schedules.

The IoT component 620 can enable cross-platform communication of one or more systems, components, or the like of the system 600. For example, The IoT component 620 can generate a map of cleanliness scores 622 to update the cleanliness summary 612. The IoT component 620 can update the map of cleanliness scores 622 with data from the data platform component 630. The IoT component 620 can update a report, summary, data packet, or the like, using information from the mobile component 610 or the data platform component 630, and transmit the updated report, summary, data packet, or the like to any components of the mobile component 610, the data platform component 630, or any other component of the system 600.

The data platform component 630 can be configured to analyze, process, or store data to help the robot 100 schedule or prioritize cleaning of different rooms cleaned by the mobile cleaning robot 100. The data platform component 630 can transmit the cleanliness score service 632 to the IoT component 620 such that the IoT component 620 can update the map cleanliness scores 622 for each room cleaned by the robot 100. In examples, the cleanliness score service 632 can be updated by any pipeline of the scoring pipelines 637. The scoring pipelines 637 can use the mission history database 634, the debris detection database 636, the mission history summary 626, or the map services 628 to update the cleanliness score service 632. The data platform component 630 can also generate a smart clean application programing interface (smart clean api 644) using one or more of the cleanliness score service 632, the intelligent room order 638, or the smart cleaning preferences 640. The data platform component 630 can transmit the smart clean api 644 to the IoT component 620 or the mobile component 610, one or more of which can communicate to the mobile cleaning robot 100 via an IoT broker 624 of the IoT component 620.

The IoT broker 624 can communicate with the mobile cleaning robot (e.g., the robot 100) to provide instructions, priorities, or updates to the mobile cleaning robot from any of the mobile component 610, the IoT component 620, or the data platform component 630. The IoT broker 624 can also receive run summaries 650 from the mobile cleaning robot. The run summaries 650 can include location data of the mobile cleaning robot, debris detection data from the mobile cleaning robot during the cleaning operations, or debris extraction data. The debris detection or extraction data can include a quantity or type of debris detected or extracted by the mobile cleaning robot. The IoT component 620 can generate a mission history summary 626 based on one or more of the location data of the mobile cleaning robot, debris detection data from the mobile cleaning robot during the cleaning operations, or debris extraction data. The IoT component 620 can transmit the mission history summary 626 to the data platform component 630 for storage (e.g., in the mission history database 634).

The maps services 628 of the IoT component 620 can also an updated map based on the run summaries 650 of the robot 100. For example, the map services 628 can be updated based on information based one or more of the location data of the mobile cleaning robot, debris detection data from the mobile cleaning robot during the cleaning operations, and debris extraction data. The IoT component 620 can transmit the map services 628 to the data platform component 630 for storage (e.g., within the debris detection database 636).

The data platform component 630 can also generate cleaning time estimates using the cleaning time estimate services 642. The cleaning time estimates services can use data from any of the IoT broker 624, the mission history summary 626, the map services 628, the mission history database 634, the debris detection database 636, the cleanliness score service 632, the intelligent room order 638, the smart cleaning preferences 640, the smart clean api 644, or any other component of the mobile component 610, the IoT component 620, or the data platform component 630 to generate time estimates for the required cleaning services to adequately clean each room that is planned to be cleaned by the robot 100. The cleaning time estimate services 642 can be transmitted by the data platform component 630 to the favorites service 615 to be shared with the user on the smart clean command 614 of the mobile component 610.

Scoring pipelines 637 can compute the cleanliness score (e.g., the cleanliness score service 632), cleaning insights, the smart cleaning preferences (e.g., the smart cleaning preferences 640), and the room order (e.g., the intelligent room order 638) using two different pipelines. A first pipeline of the scoring pipelines 637 can include a decay pipeline. The decay pipeline can include a batch pipeline that can reduce the cleanliness of each room over time. In examples, this pipeline can be set to run at different time intervals. For example, the pipeline can be run every hour, every two hours, every three hours, every four hours, every five hours, every six hours, or any hour increment up to every day, or every week. The first pipeline of the scoring pipelines 637 is discussed further with reference to FIG. 8.

A second pipeline of the scoring pipelines 637 can be a recovery pipeline. The recovery pipeline can be an event-driven pipeline that computes the the cleanliness score (e.g., the cleanliness score service 632), cleaning insights, the smart cleaning preferences (e.g., the smart cleaning preferences 640), and the room order (e.g., the intelligent room order 638) of each room as a result of the cleaning mission (e.g., from the mission history summary 626 or the mission history database 634) to update the smart cleaning command. In examples, the second pipeline of the scoring pipelines 637 can be triggered when a mission ends or when a user edits the map. When a mission ends, the second pipeline can update the cleanliness score for cleaned rooms. When a user updates the map, the second pipeline can compute cleanliness scores for any updated spaces. The second pipeline of the scoring pipelines 637 will be discussed with reference to FIG. 7.

In an operable example of the system 600, the user can interact with the mobile component 610 to select a space (e.g., a map of the cleanliness summary 612) and can review the debris detective or dirt detective for that space. The dirt detective can be populated by calling the cleanliness scores 622. The cleanliness scores 622 can pull the clean score from the smart clean api 644 to update the map for the users viewing. The smart clean command 614 can be populated by calling a favorites service 615. The favorites service 615 can retrieve the current smart clean command from the smart clean api 644. The user can implement a smart cleaning command for a selected space.

In response to the user implementing the smart cleaning command, the mobile component 610 can publish the smart clean command 614 to the IoT broker 624. The IoT broker 624 can publish the smart clean command 614 to the robot (e.g., the robot 100). The robot 100 can execute the smart clean command 614.

In response to the user scheduling the smart cleaning command for later (e.g., at a time that is not now), the IoT component 620 can store the smart clean command in a schedule service module (schedule service 617). In examples, the IoT component 620 can store the smart clean command in the schedule service 617 with a set time command to execute the smart clean command 614. When the set time command arrives, the schedule service 617 can transmit the smart clean command 614 to the IoT broker 624 and the IoT broker 624 can publish the smart clean command 614 to the robot (e.g., the robot 100) and the robot can execute the smart clean command 614.

Figure 7:
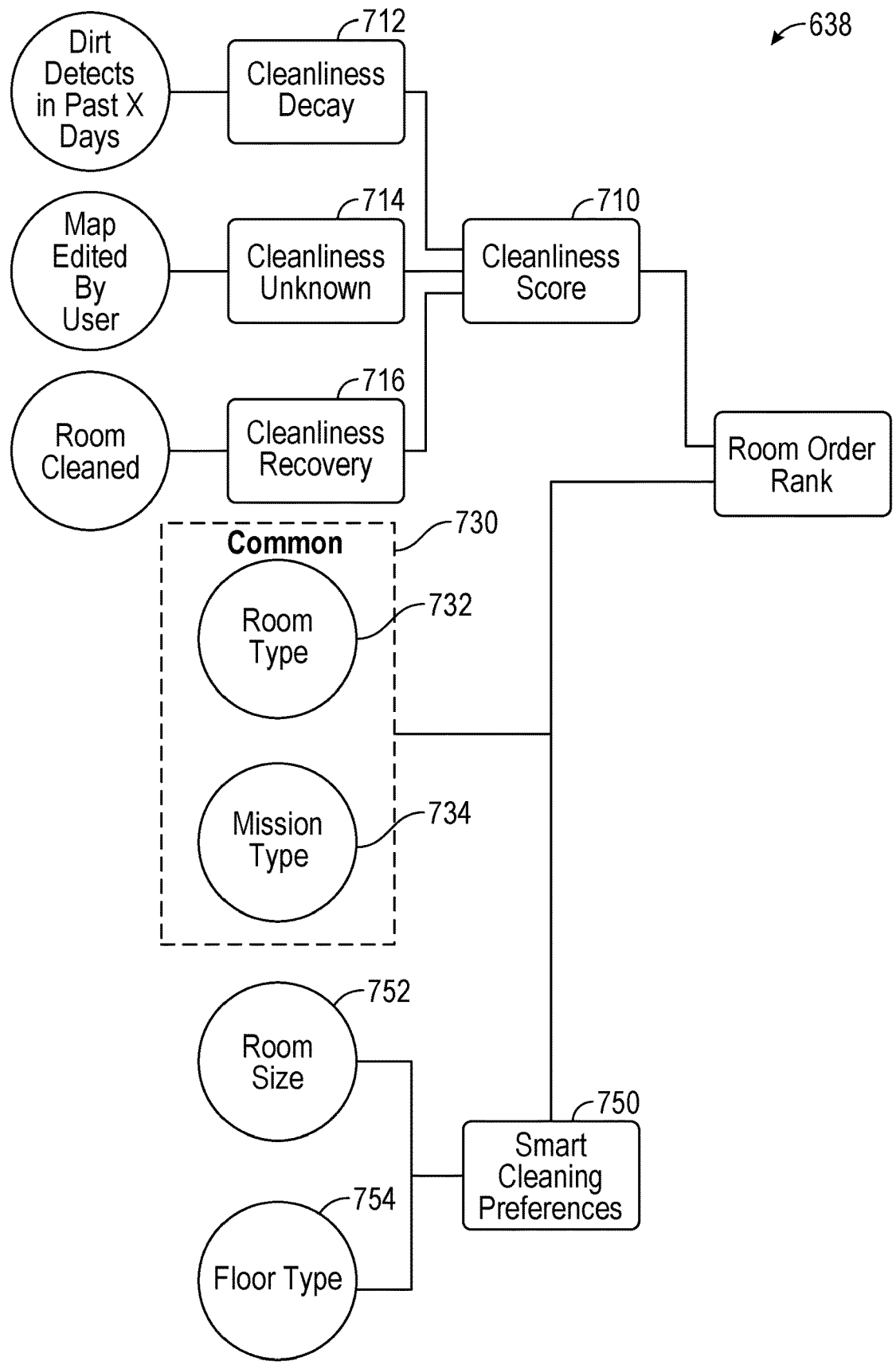
FIG. 7 illustrates a diagram illustrating an example of a room rank order of room cleaning prioritization for a mobile cleaning robot.

FIG. 7 is a diagram illustrating an example of the room rank order (e.g., the intelligent room order 638) of room cleaning prioritization for a mobile cleaning robot (e.g., the robot 100 (FIG. 1)). As shown in FIG. 7, the intelligent room order 638 can include a cleanliness score 710, one or more room parameters 730, and one or more cleaning preferences 750.

The cleanliness score 710 can be updated, for example, by the data platform component 630 (FIG. 6), based on debris detected or extracted by the mobile cleaning robot. The cleanliness score 710 can be updated based on historical data stored in the mission history database 634 and the debris detection database 636. The cleanliness score 710 can also be influenced by a cleanliness decay module 712, a cleanliness unknown module 714, or a cleanliness recovery module 716.

The cleanliness decay module 712 can be configured to update a cleanliness score for each room based on historical data of debris detected or extracted from the room. As such, the cleanliness decay module 712 can access the mission history database 634 or the debris detection database 636 (FIG. 6) and update the cleanliness score 710 based on information from the mission history database 634 or the debris detection database 636. For example, based on information in the mission history database 634 and the debris detection database 636, the cleanliness decay module 712 can determine a typical cleanliness decay of each room cleaned by the mobile cleaning robot. Here, the cleanliness decay module 712 can determine a rate of cleanliness decay expected for each room by comparing an amount of time between cleanings and an amount of debris either extracted or detected in each of those cleanings. Thus, the cleanliness decay module 712 can predict cleanliness decay of each room cleaned by the mobile cleaning robot to update the cleanliness score 710 as a function of time between cleanings.

The cleanliness unknown module 714 can be configured to alter the cleanliness score 710 when the cleanliness of a room, or a portion of a room is unknown based on information from the mission history database 634 or the debris detection database 636. The cleanliness unknown module 714 can analyze the information in the mission history database 634 or the debris detection database 636 to determine rooms, or portions of rooms, that were not covered by the mobile cleaning robot, and increase an uncertainty of the cleanliness score for the respective rooms, or portions of rooms. Thus, the cleanliness unknown module 714 can update the cleanliness score 710 based on the uncertainty of cleanliness in each room, or portions of rooms, that the robot can have missed on previous cleaning missions.

The cleanliness recovery module 716 can be configured to update the cleanliness score 710 for each room cleaned by the mobile cleaning robot. The cleanliness recovery module 716 can be based on the information stored in the mission history database 634 or the debris detection database 636 for each mobile cleaning mission of the mobile cleaning robot. In examples, the cleanliness recovery module 716 can compare data in the mission history database 634 or the debris detection database 636 to historical averages of debris detected and debris extracted to estimate a cleanliness of the respective room, or portion of the respective room, after each cleaning operation by the mobile cleaning robot. The cleanliness recovery module 716 can also compare debris detected and the debris extracted (e.g., using the dirt sensor 144) to calculate a cleanliness recovery and update the cleanliness score 710 for each respective room cleaned by the mobile cleaning robot.

The one or more room parameters 730 can also influence the intelligent room order 638. The one or more room parameters 730 can include any one or more of a room type 732 or a mission type 734. The room type 732 can include one or more of a bedroom, kitchen, bathroom, laundry room, dining room, entryway, kid bedroom, basement, porch, pet room, or the like. The mission type 734 can include one or more of vacuuming, mopping, or the like.

The one or more room parameters 730 can be used in concert to influence the intelligent room order 638 by determining the types of rooms (e.g., kids rooms, kitchens, bathrooms, pet rooms, or the like) cleaned by the mobile cleaning robot that require cleaning more frequently than other room types (e.g., guest bedroom, formal family room, home office, or the like). Thus, the room type 732 can help the data platform component 630 update the intelligent room order 638 by comparing each of the room type 732 and prioritizing the room types that require cleaning more frequently.

The mission type 734 can also help the data platform component 630 update the intelligent room order 638 because the mission type 734 helps the data platform component 630 prioritize cleanings of different modes based on many factors. For example, the data platform component 630 can prioritize rooms that have a lot of mopping if the debris collection is almost full or the data platform component 630 or prioritize rooms with a lot of vacuuming if the detergent level is running low on the mobile cleaning robot.

In examples, the data platform component 630 can use a combination of the room type 732 and the mission type 734 to update the intelligent room order 638. For example, if a room is determined to need cleaning more frequently than a second room, and both rooms require mopping, the data platform component 630 can prioritize the mopping in the room that requires cleaning more frequently over the other room to ensure the mopping is completed in the room that likely needs the cleaning more urgently.

The one or more smart cleaning preferences 750 can be configured to help the data platform component 630 update the intelligent room order 638. The one or more cleaning preferences 750 can include a room size 752 and a floor type 754 for each room cleaned by the mobile cleaning robot. The data platform component 630 can use the room size 752 and the floor type 754 (e.g., hardwood, vinyl, stone, linoleum, carpet type (e.g., twist carpet, loop carpet, pattern carpet, or the like), carpet lengths (e.g., low, medium, and high pile heights), or the like) to update the intelligent room order 638.

The room size 752 can help the data platform component 630 prioritize rooms based on time permitted to complete cleaning. In examples, the user can set preferred times that the mobile cleaning robot performs cleaning operations, and the data platform component 630 can predict an amount of time required to clean a room based on the room size 752. As such, the data platform component 630 can use the room size 752 to help inform the intelligent room order 638 and ensure that all required, or most debris-filled rooms, are cleaned within the preferred cleaning times.

The floor type 754 can help the data platform component 630 prioritize rooms based on the cleaning type (e.g., the mission type 734) required to clean each room cleaned by the mobile cleaning robot. The floor type 754 can also influence one or more operating parameters of the cleaning system (e.g., the cleaning system 310 (FIG. 3)). The floor type 754 can adjust the suction motor fan (e.g., the suction fan motor 316 (FIG. 3)) to increase or decrease an amount of suction required to clean each room based on the floor type 754 of the respective room. For example, if the carpeting has a high pile height, the suction motor fan can run at a higher rate than for carpeting with a low pile height, which can cause a reduction in cleaning duration prior to recharging. Therefore, the data platform component 630 can use the floor type 754 to prioritize the rooms cleaned by the robot to ensure rooms that need the cleaning most, that are similar room types, are higher priority on the intelligent room order 638.

Figure 8:
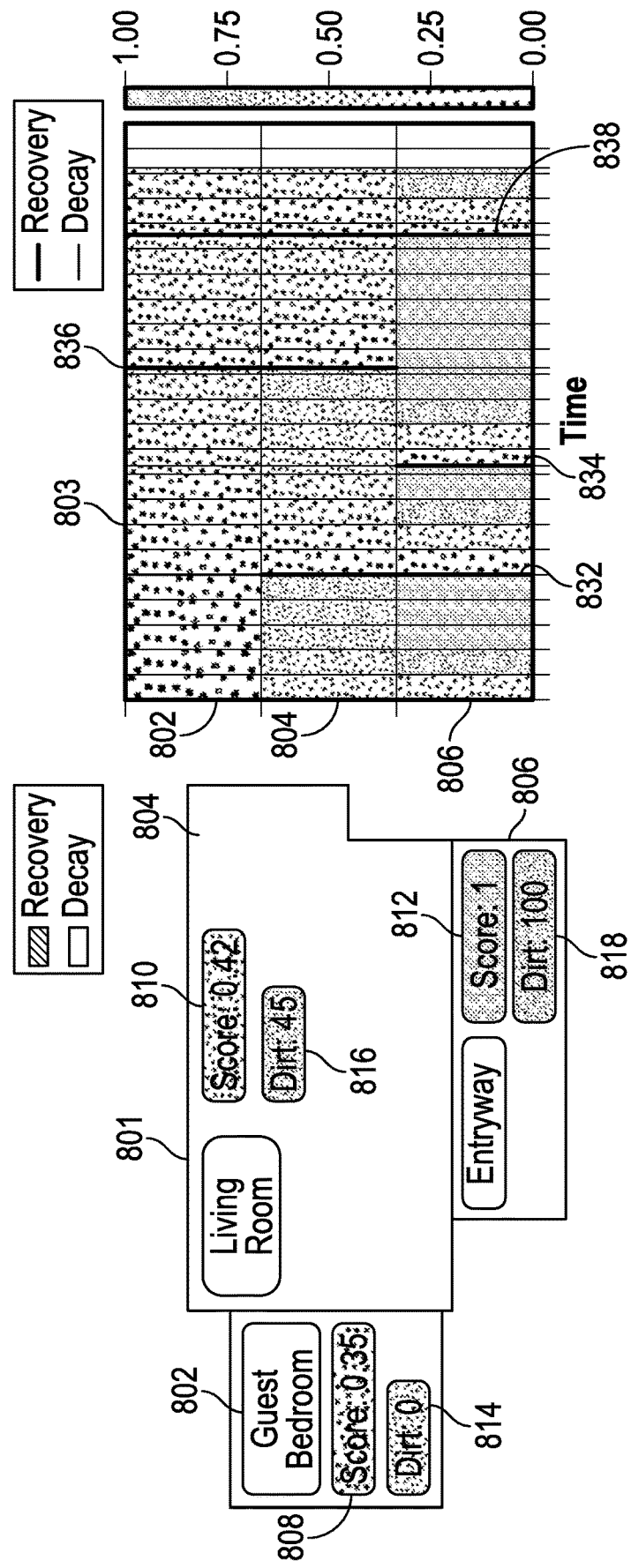
FIG. 8 illustrates a diagram illustrating an example of cleanliness degradation.

FIG. 8 is a diagram illustrating an example of cleanliness degradation. FIG. 8 shows a sample map 801 and a cleanliness recovery and decay chart 803. As discussed above, cleanliness degradation can be tracked by the cleanliness decay module 712 (FIG. 7). In the example schematic shown in the sample map 801, each of the rooms (e.g., first room 802, second room 804, and third room 806) can have a respective cleanliness score (e.g., first room cleanliness score 808, second room cleanliness score 810, and third room cleanliness score 812) and a debris detection score (e.g., first debris detection score 814, second debris detection score 816, and third debris detection score 818). As discussed herein, as time passes, the data platform component 630 can initiate the cleanliness decay module 712 to update the cleanliness scores and after each mission, the data platform component 630 can update the debris detection score for each of the rooms.

The cleanliness recovery and decay chart 803 can include a first cleaning instance 832, a second cleaning instance 834, a third cleaning instance 836, and a fourth cleaning instance 838. As shown in the sample map 801, the third room 806 had the highest (e.g., the worst) cleanliness core and the highest debris detection score, thus, the third room 806 was instructed to be cleaned during the first cleaning instance 832, second cleaning instance 834, and fourth cleaning instance 838. In contrast, the first room 802 had the lowest cleanliness score and the lowest debris detection score, so the first room 802 was instructed to be only cleaned during the third cleaning instance 836 and the fourth cleaning instance 838.

As shown in the cleanliness recovery and decay chart 803, each cleaning instance can reset the cleanliness score, and as time moves forward, the cleanliness of each room can decay at least partially on the debris detected during the previous cleaning instances. Thus, because each of the rooms has a different debris detection score, each of the rooms can have a unique or individualized rate of cleanliness decay. As such, as seasons change, or a user's habits change, the cleanliness decay can be updated by the cleanliness decay module 712 as the cleanliness scores and debris detected scores change.

In examples, as shown at the third cleaning instance 836 for the first room 802, there can be a partial recovery incident. In a partial recovery incident, the cleanliness recovery module 716 (FIG. 7) can compare an area cleaned via the run summaries 650 (FIG. 6), or another data source within the system 600 (FIG. 6), to a known area of the first room 802. In such a calculation, the cleanliness recovery module 716 can review and adjust for a number of passes the robot (e.g., the robot 100 (FIG. 1)) used to clean the first room 802 and adjust (e.g., increase or decrease) the cleanliness recovery accordingly.

Figure 9:
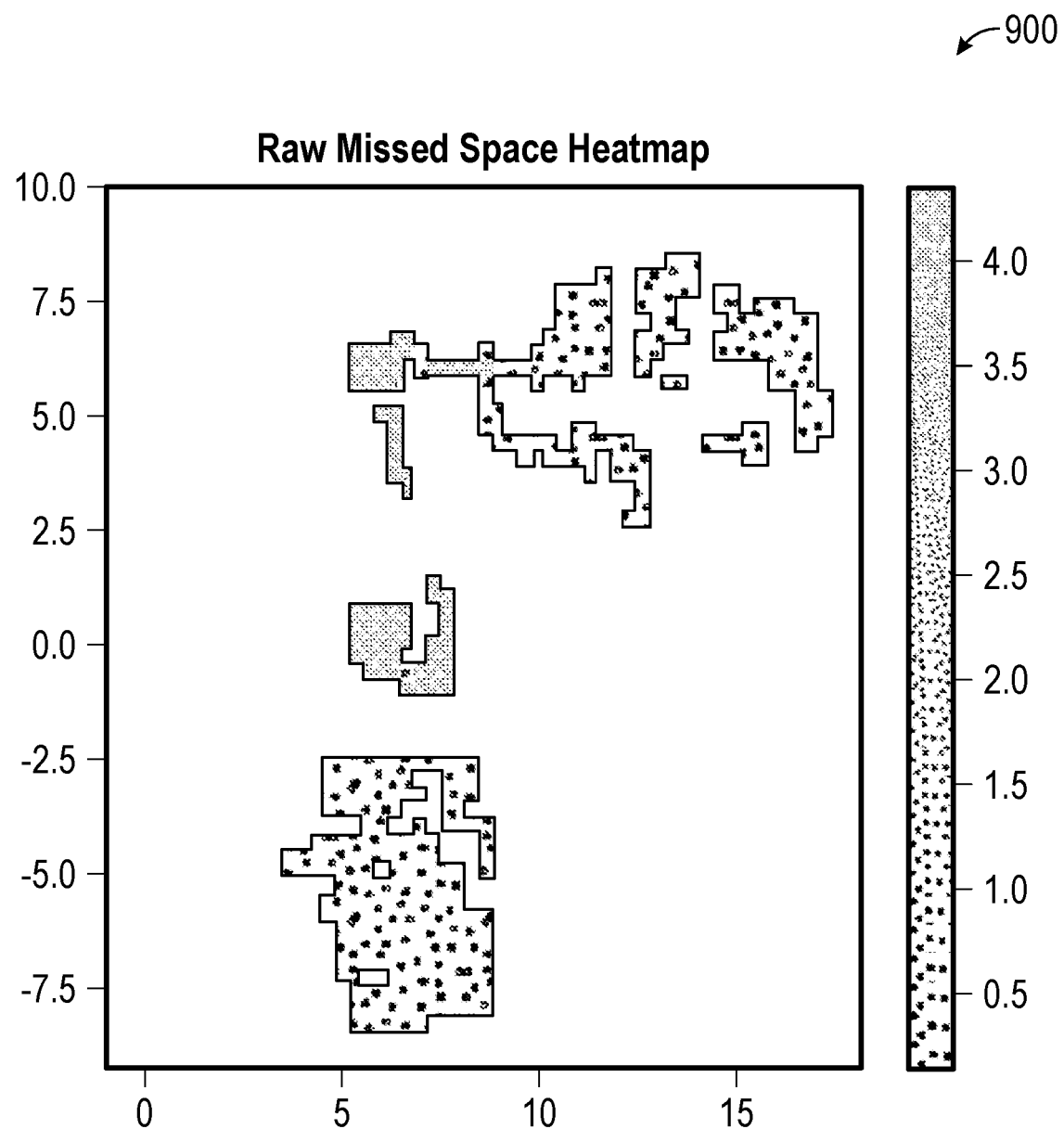
FIG. 9 illustrates a diagram illustrating an example of a raw missed space heat map for a mobile cleaning robot.
Figure 10:
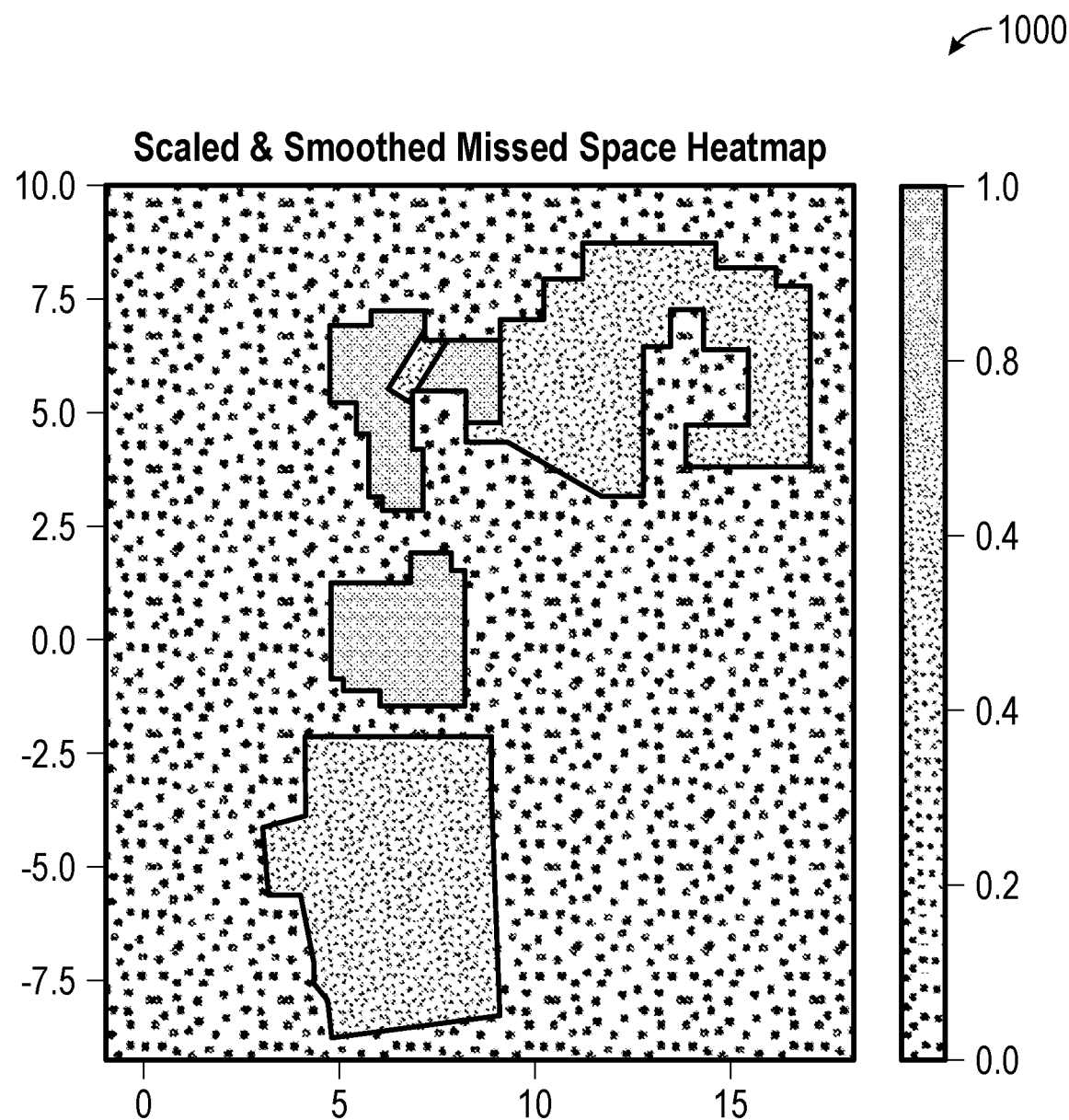
FIG. 10 illustrates a diagram illustrating an example of a scaled and smoothed missed space heat map for a mobile cleaning robot.
Figure 11:
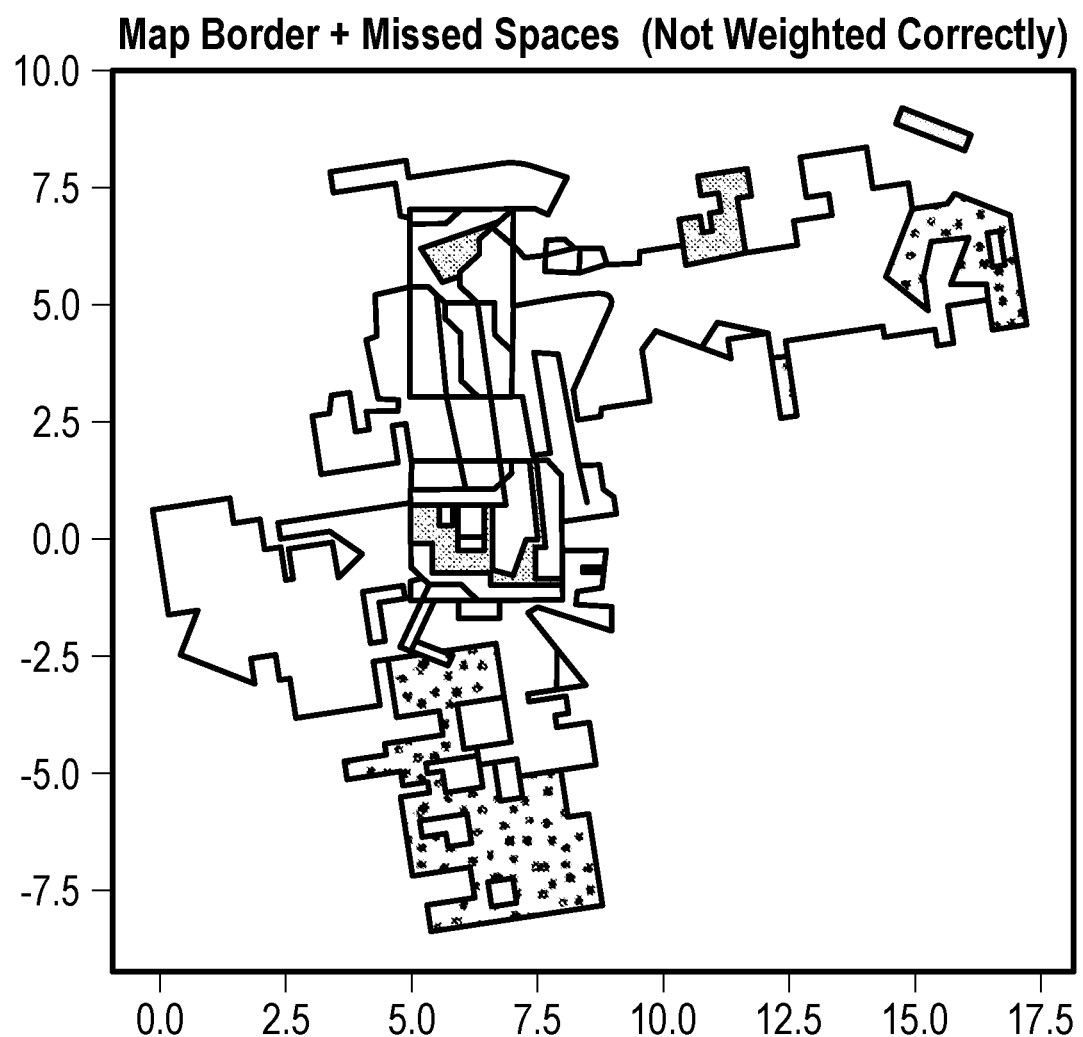
FIG. 11 illustrates a diagram illustrating an example of a map border with the missed space heat map for a mobile cleaning robot.

FIGS. 9-11 will be discussed together below. FIG. 9 is a diagram illustrating an example of a raw missed space heat map 900 for a mobile cleaning robot (e.g., the robot 100 (FIG. 1)). FIG. 10 is a diagram illustrating an example of a scaled and smoothed missed space heat map 1000 for the mobile cleaning robot. FIG. 11 is a diagram illustrating an example of a map border with a missed space heat map 1100 for the mobile cleaning robot. The raw missed space heat map 900, the scaled and smoothed missed space heat map 1000, and the missed space heat map 1100 can be updated by the mobile component 610, IoT component 620, or the data platform component 630. For example, the raw missed space heat map 900, the scaled and smoothed missed space heat map 1000, and the missed space heat map 1100 can be updated by the IoT broker 624 when the IoT broker 624 generates the map services 628, or the cleanliness unknown module 714 to determine areas of the cleaning environment of the mobile cleaning robot that include unknown cleanliness.

The raw missed space heat map 900 can show the raw collected data including areas, rooms, or portions of rooms, that the mobile cleaning robot missed during cleaning operations. The raw missed space heat map 900 can be scaled and smoothed by the mobile component 610, the IoT component 620, or the data platform component 630 to remove noise and generate the scaled and smoothed missed space heat map 1000. The mobile component 610, the IoT component 620, or the data platform component 630 can then generate the missed space heat map 1100 from the scaled and smoothed missed space heat map 1000 to produce a map of the areas cleaned by the mobile cleaning robot, including appropriate borders, which highlights areas, rooms, or portions of rooms that have been missed during cleaning operations. In examples, the system 600 (FIG. 6) can prioritize cleaning these areas, rooms, or portions of rooms, or can send a signal to the user (e.g., the user 60 (FIG. 1)) to suggest they make changes in the room to permit access to the missed areas, rooms, or portions of rooms for the mobile cleaning robot.

FIGS. 12-17 are example UI interfaces that can be displayed on a mobile device 1200 (e.g., the mobile device 404 (FIG. 4), the mobile device 520 (FIG. 5), the mobile component 610 (FIG. 6), or the like).

Figure 12:
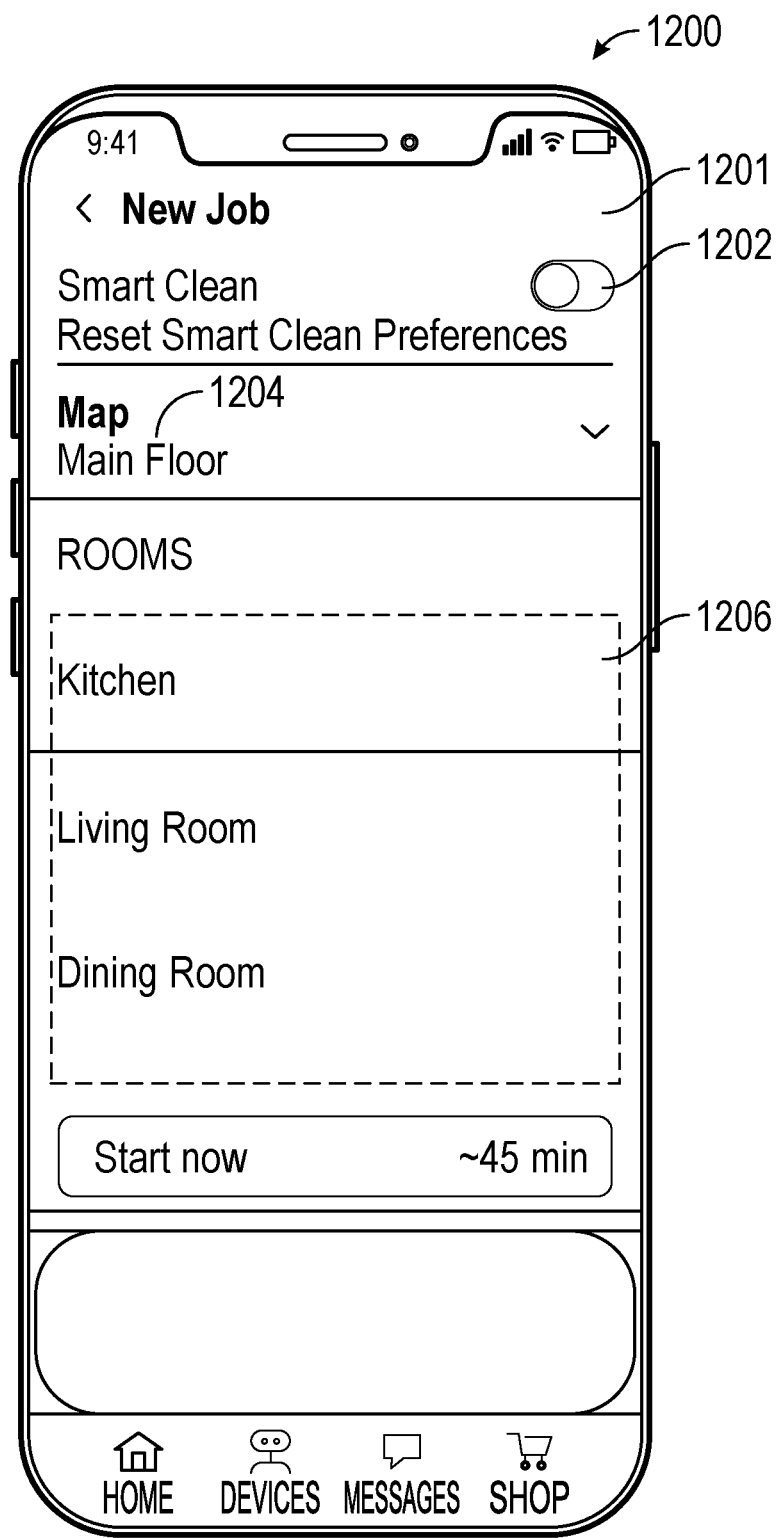
FIG. 12 illustrates an example user interface on a mobile device.

FIG. 12 shows an example user interface 1201 on a mobile device 1200. As shown in FIG. 12, the user interface 1201 on the mobile device 1200 can include a smart clean toggle 1202, which can permit a user to turn on or off the smart clean mode. In examples, the smart clean mode can activate the system 600 to auto prioritize and schedule cleaning of rooms. The user interface 1201 can also include a map floor menu 1204, which can allow the user to select a level of the house that the mobile cleaning robot is on to customize cleaning operations on each level of the house. The user interface can also list each of rooms 1206 on the selected floor via the map floor menu 1204.

Figure 13:
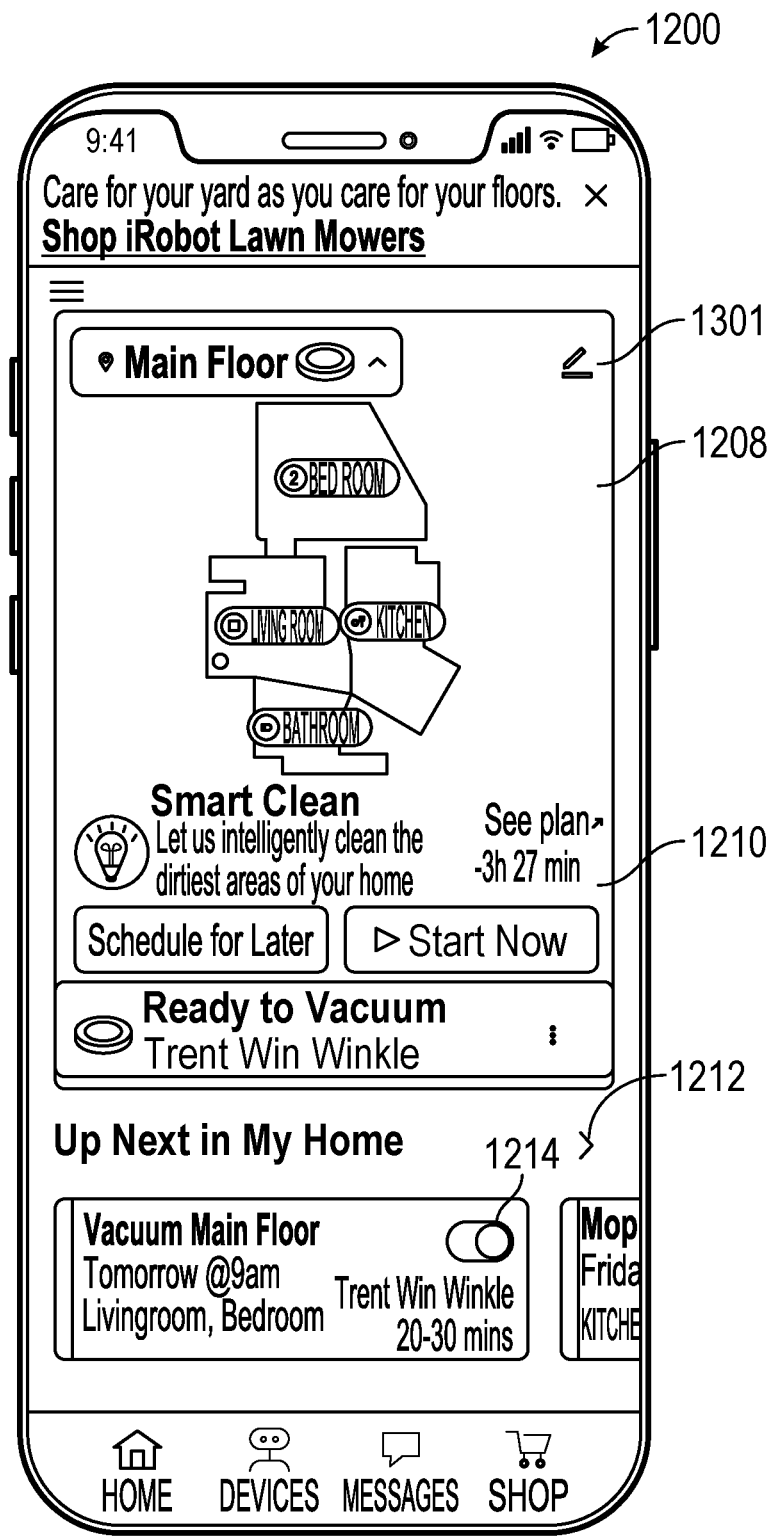
FIG. 13 illustrates an example user interface on a mobile device.

FIG. 13 shows an example user interface 1301 on the mobile device 1200. As shown in FIG. 13, the user interface 1301 on the mobile device 1200 can include a map 1208 of the floor selected in the map floor menu 1204 (FIG. 12). The map 1208 can include a cleanliness score (such as the cleanliness score 710 (FIG. 7) for each of the rooms shown on the map 1208. The user interface 1301 on the mobile device 1200 can also include a smart clean preview 1210, which can show an estimated cleaning time for the proposed schedule from the system 600 (FIG. 6). A next up listing 1212 can also include a listing of the planned cleanings for the robot 100 (FIG. 1). Each of the listings of the next up listing 1212 can include a toggle indication 1214, which can be selectable by the user to skip a planned cleaning in the next up listing 1212.

Figure 14:
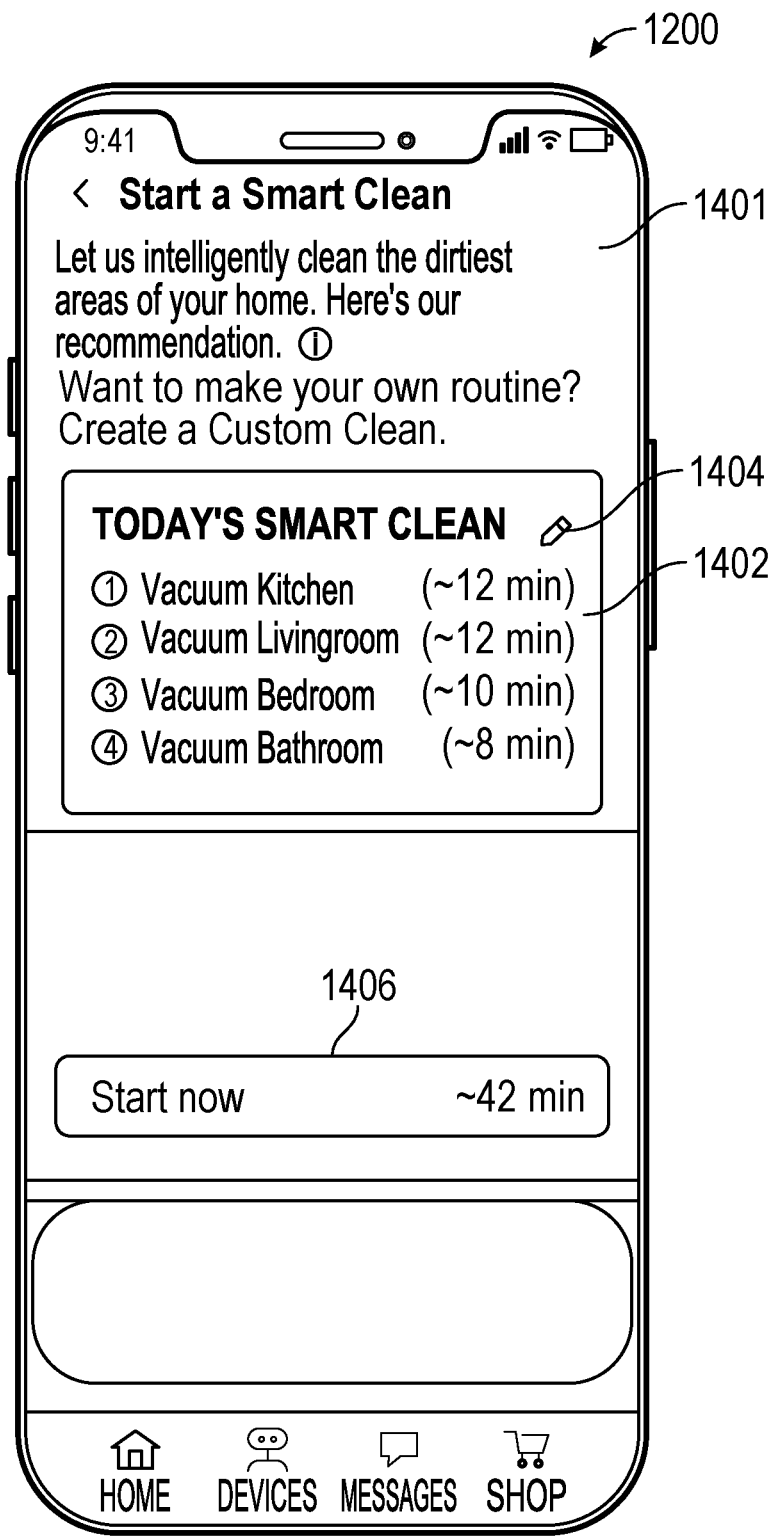
FIG. 14 illustrates an example user interface on a mobile device.

FIG. 14 shows an example user interface 1401 on the mobile device 1200. The user interface 1401 can include a smart clean schedule 1402, a customize smart clean button 1404, and a start now button 1406. The smart clean schedule 1402 can include the intelligent room order 638 (FIG. 6) and a planned operation run time and a date the cleaning operations are planned to be completed. Ine examples, the smart clean schedule 1402 can be for any amount of time. For example, the smart clean schedule 1402 can be for the current day, the next couple of days, the next few days, the next week, or the next month. In examples, the user (e.g., the user 60) can customize what is shown in the smart clean schedule 1402.

The customize smart clean button 1404 can provide the user (the user 60) an opportunity to create a cleaning schedule, or adjust one or more elements of the intelligent room order 638. For example, the customize smart clean button 1404 can instruct the mobile cleaning robot to only vacuum a room, instead of vacuum and mop a room, skip a room, or prioritize another room on top of the planned rooms. In examples, the user 60 can also set a time that they want all of the rooms on the intelligent room order 638 to be cleaned, which can override the Do-Not-Disturb Routine 533 (FIGS. 5A and 5B).

The start now indication 1406 can be selectable to instruct the mobile component 610, IoT component 620, or data platform component 630, or any other component of the system 600 to send a signal to the mobile cleaning robot to start cleaning the environment (such as the environment 40) based on the intelligent room order 638. The indication 1406 can be selectable to override any other limitations on the operations of the mobile cleaning robot to start the cleaning of the rooms on the intelligent room order 638 before the planned start time of the cleaning operations.

Figure 15:
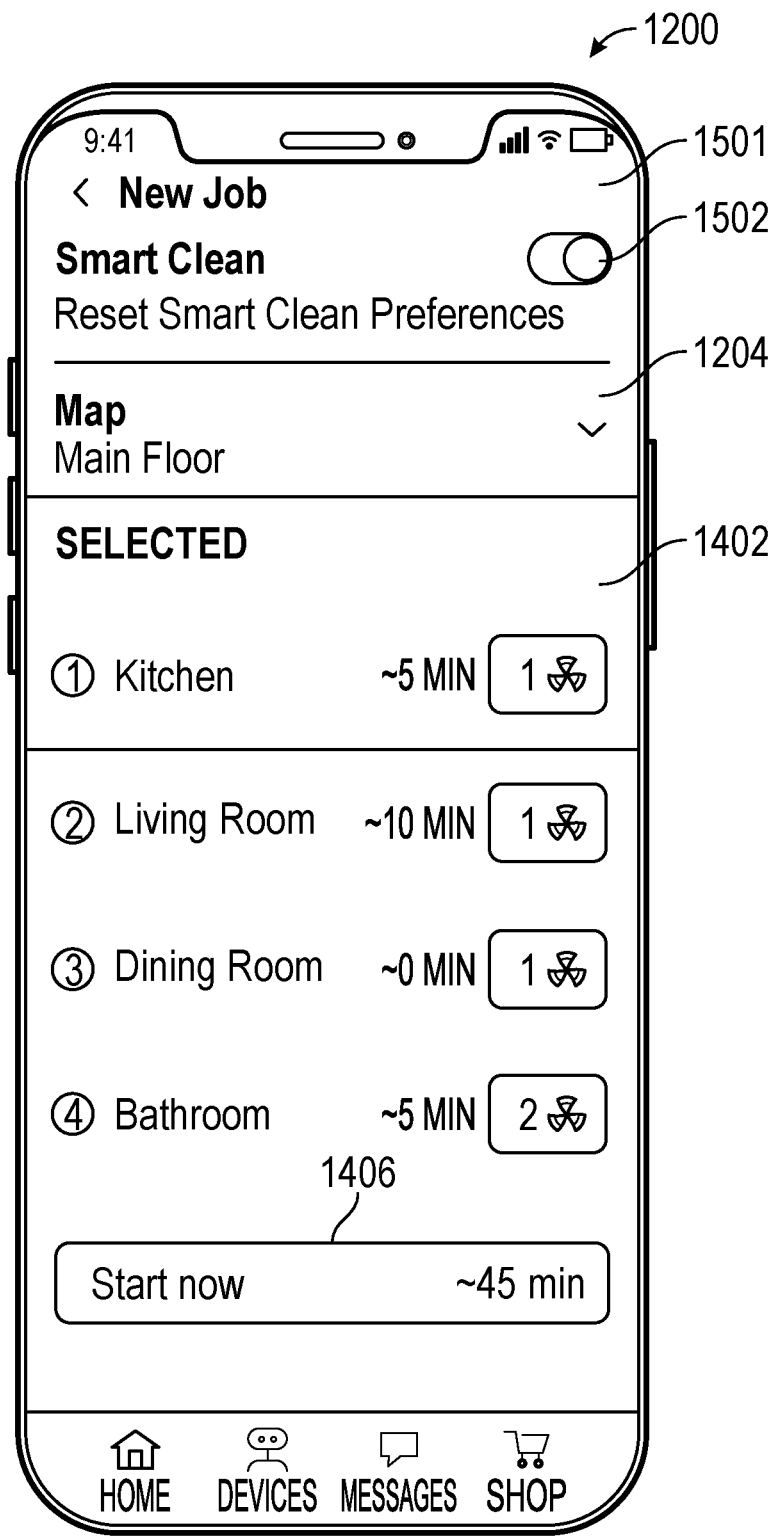
FIG. 15 illustrates an example user interface on a mobile device.
Figure 16:
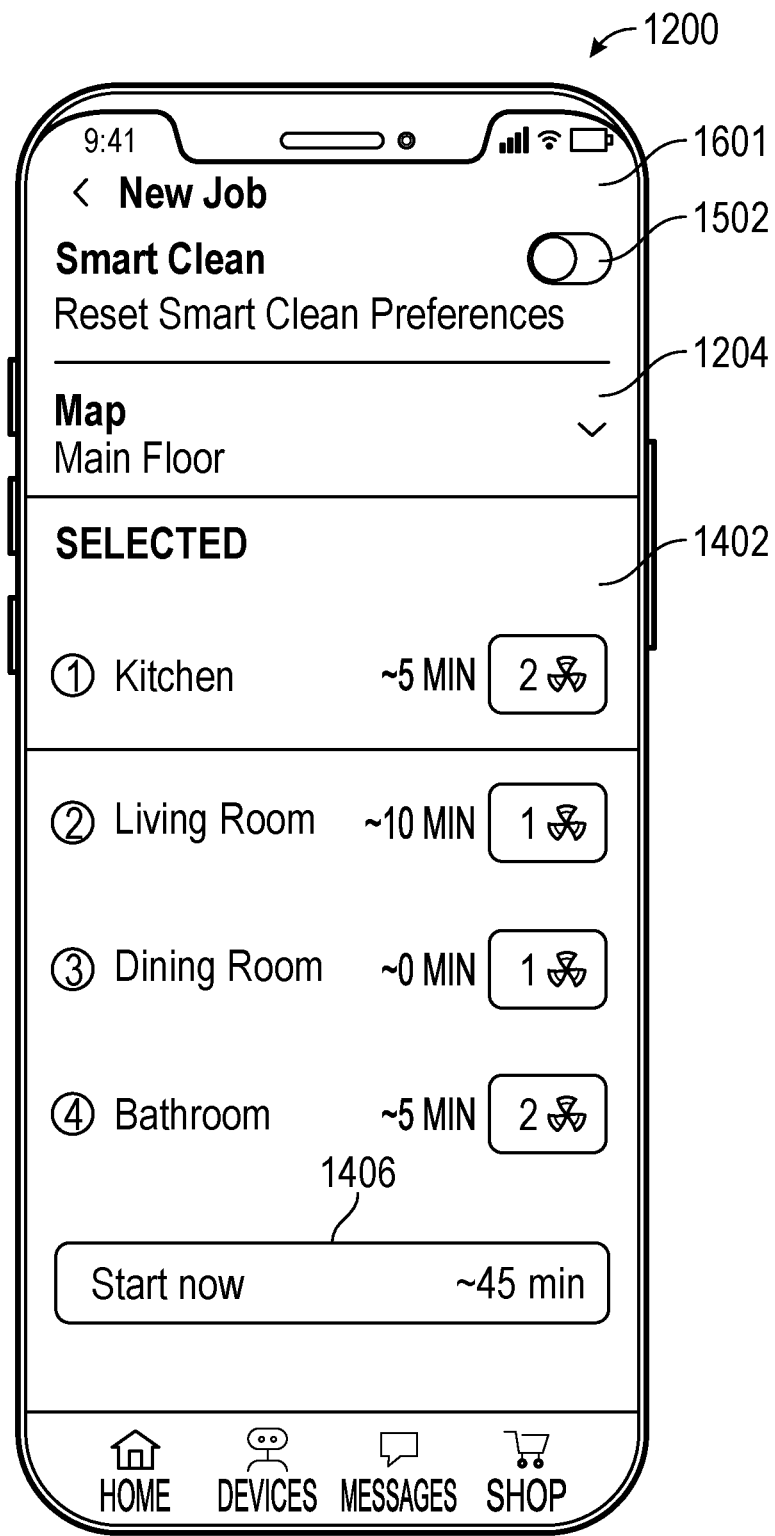
FIG. 16 illustrates an example user interface on a mobile device.
Figure 17:
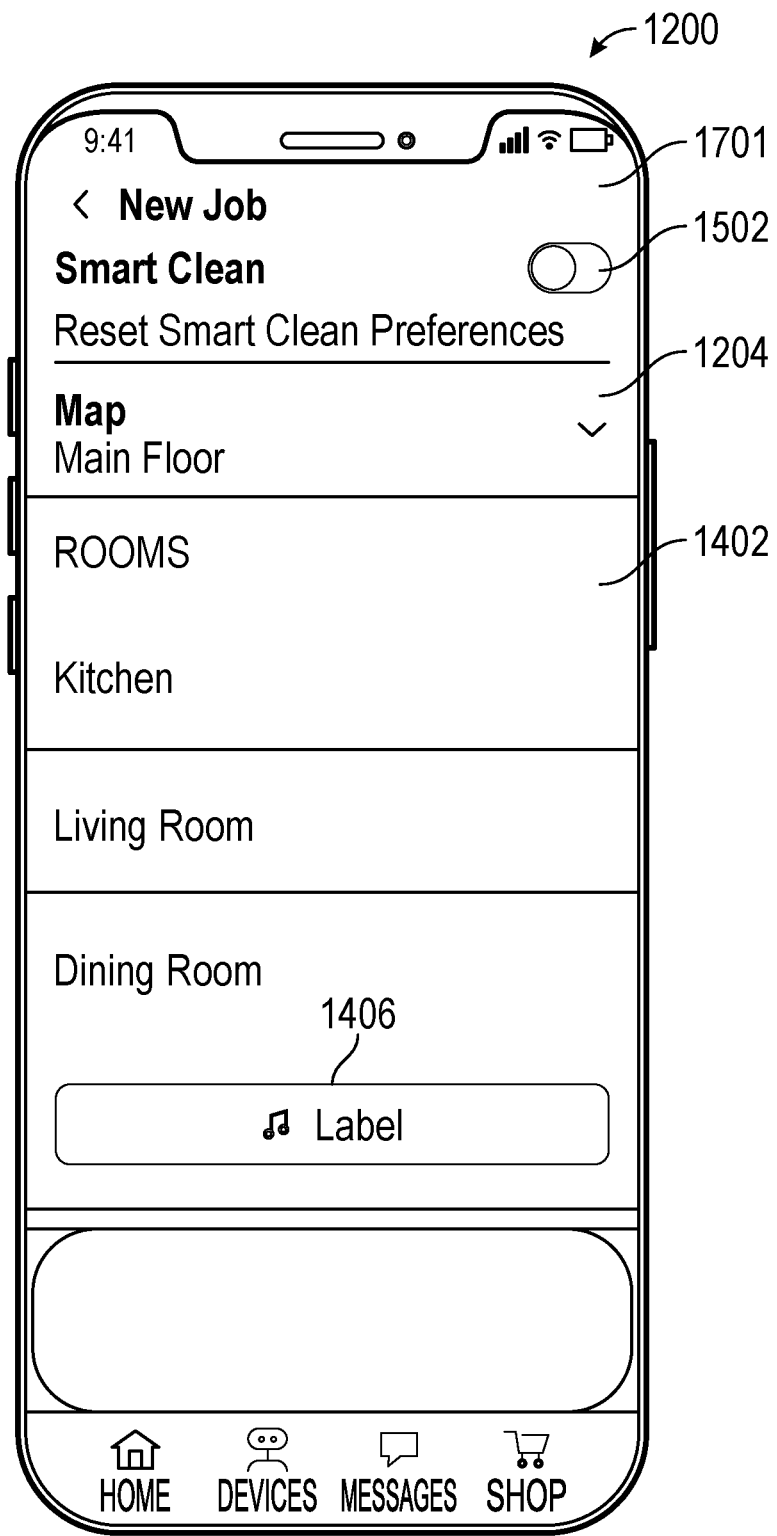
FIG. 17 illustrates an example user interface on a mobile device.

FIGS. 15-17 will be discussed together below. FIG. 15 shows an example user interface 1501 on the mobile device 1200. FIG. 16 shows an example user interface 1501 on the mobile device 1200. FIG. 17 shows an example user interface 1501 on the mobile device 1200.

The user interface 1501 can include a smart clean toggle indication 1502, the map floor menu 1204 (to select a floor the mobile cleaning robot is performing cleaning operations), and the smart clean preview 1210. As shown in FIG. 15, the smart clean toggle indication 1502 can be toggled on to cause the smart clean preview 1210 to provide each room on the intelligent room order 638 including information about the cleaning (mission type, cleaning parameters, or the like). The user can select the start now indication 1406, which can cause the mobile component 610, IoT component 620, or data platform component 630, or any other component of the system 600 to send a signal to the mobile cleaning robot to begin cleaning in the order determined by the intelligent room order 638.

As shown in FIG. 16, the smart clean toggle indication 1502 can be toggled off and the smart clean preview 1210 can provide each room on the intelligent room order 638 including information about the cleaning (mission type, cleaning parameters, or the like). The user can hit the start now indication 1406, which can cause the mobile component 610, IoT component 620, or data platform component 630, or any other component of the system 600 to send a signal to the mobile cleaning robot to begin cleaning in the order determined by the intelligent room order 638.

As shown in FIG. 17, the smart clean toggle indication 1502 can be toggled off and the smart clean preview 1210 can provide each room on the intelligent room order 638 with no additional information about the cleaning (mission type, cleaning parameters, or the like). The user can select the start now indication 1406, which can cause the mobile component 610, IoT component 620, or data platform component 630, or any other component of the system 600 to send a signal to the mobile cleaning robot to begin cleaning in the order determined by the intelligent room order 638.

Figure 18:
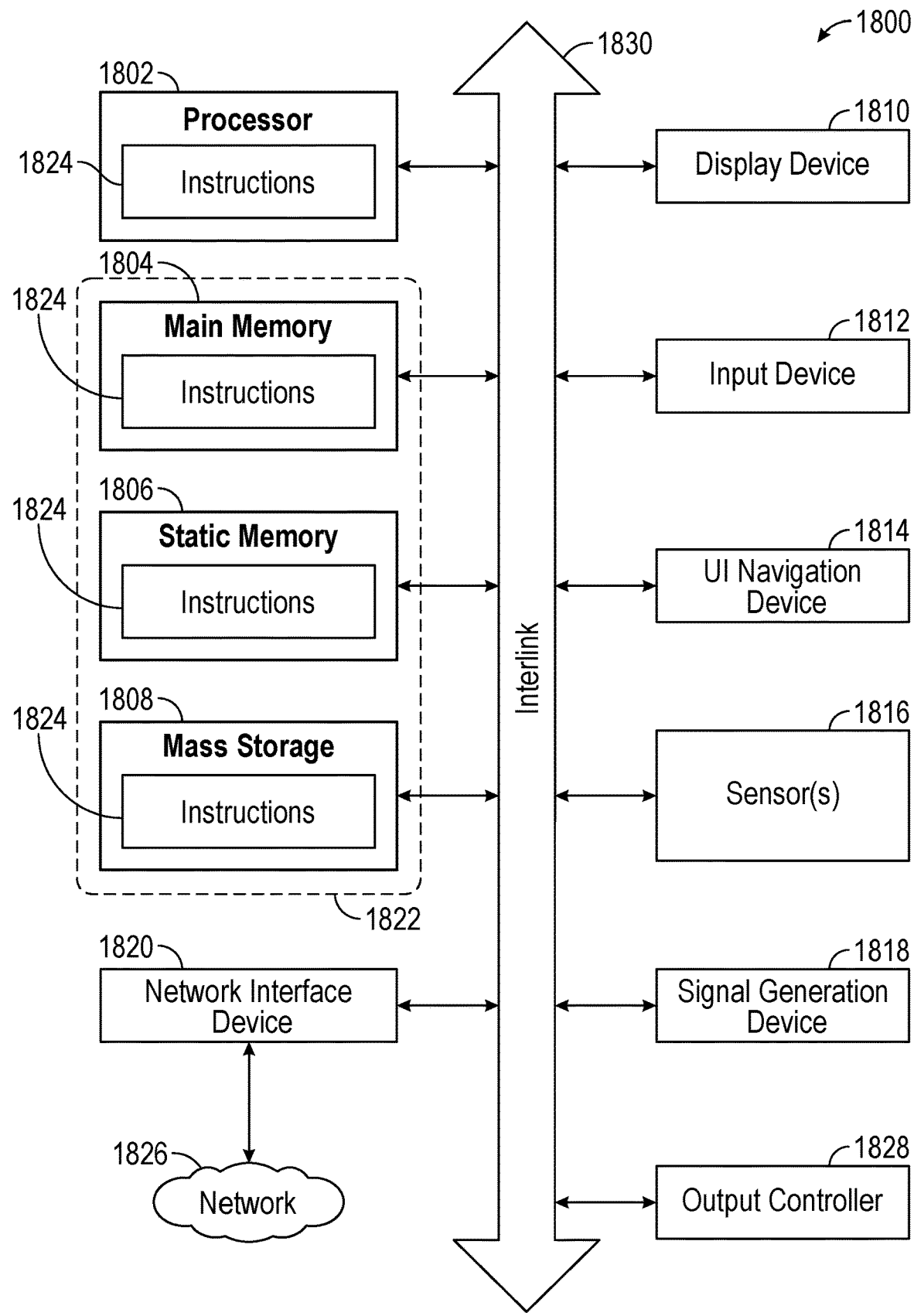
FIG. 18 illustrates a block diagram illustrating an example of a machine upon which one or more examples can be implemented.

FIG. 18 illustrates a block diagram of an example machine 1800 upon which any one or more of the techniques (e.g., methodologies) discussed herein can perform. Examples, as described herein, can include, or can operate by, logic or a number of components, or mechanisms in the machine 1800. Circuitry (e.g., processing circuitry) is a collection of circuits implemented in tangible entities of the machine 1800 that include hardware (e.g., simple circuits, gates, logic, or the like.). Circuitry membership can be flexible over time. Circuitries include members that may, alone or in combination, perform specified operations when operating. In examples, hardware of the circuitry can be immutably designed to carry out a specific operation (e.g., hardwired). In examples, the hardware of the circuitry can include variably connected physical components (e.g., execution units, transistors, simple circuits, or the like.) including a machine readable medium physically modified (e.g., magnetically, electrically, moveable placement of invariant massed particles, or the like.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in examples, the machine-readable medium elements are part of the circuitry or are communicatively coupled to the other components of the circuitry when the device is operating. In examples, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1800 follow.

In alternative examples, the machine 1800 can operate as a standalone device or can be connected (e.g., networked) to other machines. In a networked deployment, the machine 1800 can operate in the capacity of a server machine, a client machine, or both in server-client network environments. In examples, the machine 1800 can act as a peer machine in peer-to-peer (P2P) (or other distributed) network environment. The machine 1800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1800 can include a hardware processor 1802 (e.g., a central processing unit (CPU), a graphics processing unit (GPU), a hardware processor core, or any combination thereof), a main memory 1804, a static memory (e.g., memory or storage for firmware, microcode, a basic-input-output (BIOS), unified extensible firmware interface (UEFI), or the like.) 1806, and mass storage 1808 (e.g., hard drives, tape drives, flash storage, or other block devices) some or all of which can communicate with each other via an interlink (e.g., bus) 1830. The machine 1800 can further include a display unit 1810, an alphanumeric input device 1812 (e.g., a keyboard), and a user interface (UI) navigation device 1814 (e.g., a mouse). In examples, the display unit 1810, input device 1812 and UI navigation device 1814 can be a touch screen display. The machine 1800 can additionally include a storage device (e.g., drive unit) 1808, a signal generation device 1818 (e.g., a speaker), a network interface device 1820, and one or more sensors 1816, such as a global positioning system (GPS) sensor, compass, accelerometer, or other sensor. The machine 1800 can include an output controller 1828, such as a serial (e.g., universal serial bus (USB), parallel, or other wired or wireless (e.g., infrared (IR), near field communication (NFC), or the like.) connection to communicate or control one or more peripheral devices (e.g., a printer, card reader, or the like.).

Registers of the processor 1802, the main memory 1804, the static memory 1806, or the mass storage 1808 can be, or include, a machine readable medium 1822 on which is stored one or more sets of data structures or instructions 1824 (e.g., software) embodying or utilized by any one or more of the techniques or functions described herein. The instructions 1824 can also reside, completely or at least partially, within any of registers of the processor 1802, the main memory 1804, the static memory 1806, or the mass storage 1808 during execution thereof by the machine 1800. In examples, one or any combination of the hardware processor 1802, the main memory 1804, the static memory 1806, or the mass storage 1808 can constitute the machine readable media 1822. While the machine readable medium 1822 is illustrated as a single medium, the term "machine readable medium" can include a single medium or multiple media (e.g., a centralized or distributed database, or associated caches and servers) configured to store the one or more instructions 1824.

The term "machine readable medium" can include any medium that is capable of storing, encoding, or carrying instructions for execution by the machine 1800 and that cause the machine 1800 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, or the like.). In examples, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In examples, information stored or otherwise provided on the machine readable medium 1822 can be representative of the instructions 1824, such as instructions 1824 themselves or a format from which the instructions 1824 can be derived. This format from which the instructions 1824 can be derived can include source code, encoded instructions (e.g., in compressed or encrypted form), packaged instructions (e.g., split into multiple packages), or the like. The information representative of the instructions 1824 in the machine readable medium 1822 can be processed by processing circuitry into the instructions to implement any of the operations discussed herein. For example, deriving the instructions 1824 from the information (e.g., processing by the processing circuitry) can include: compiling (e.g., from source code, object code, or the like.), interpreting, loading, organizing (e.g., dynamically or statically linking), encoding, decoding, encrypting, unencrypting, packaging, unpackaging, or otherwise manipulating the information into the instructions 1824.

In examples, the derivation of the instructions 1824 can include assembly, compilation, or interpretation of the information (e.g., by the processing circuitry) to create the instructions 1824 from some intermediate or preprocessed format provided by the machine readable medium 1822. The information, when provided in multiple parts, can be combined, unpacked, and modified to create the instructions 1824. For example, the information can be in multiple compressed source code packages (or object code, or binary executable code, or the like.) on one or several remote servers. The source code packages can be encrypted when in transit over a network and decrypted, uncompressed, assembled (e.g., linked) if necessary, and compiled or interpreted (e.g., into a library, stand-alone executable or the like.) at a local machine, and executed by the local machine.

The instructions 1824 can be further transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), or the like.). Example communication networks can include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 502.11 family of standards known as Wi-Fi®, IEEE 502.15.4 family of standards, peer-to-peer (P2P) networks, among others. In examples, the network interface device 1820 can include one or more physical jacks (e.g., Ethernet, coaxial, or phone jacks) or one or more antennas to connect to the communications network 1826. In examples, the network interface device 1820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1800, and includes digital or analog communications signals or other intangible medium to facilitate communication of such software. A transmission medium is a machine-readable medium.

The following, non-limiting examples, detail certain aspects of the present subject matter to solve the challenges and provide the benefits discussed herein, among others.

Example 1 is a method of prioritizing cleaning of rooms of an environment for a mobile cleaning robot, the method comprising: generating, using a controller, a cleanliness score for each room of the environment, each of the cleanliness scores indicative of an amount of debris expected in each respective room by the mobile cleaning robot; generating a room cleaning priority based at least partially on the cleanliness score of each of the rooms; and scheduling operations of the mobile cleaning robot for a planned mission based on the room cleaning priority of each of the rooms of the environment.

In Example 2, the subject matter of Example 1 includes, updating a cleaning report including the cleanliness score for each room cleaned by the mobile cleaning robot.

In Example 3, the subject matter of Example 2 includes, updating the cleanliness score for each room based on historical degradation of each respective room of the environment, the historical degradation of each respective room based on historical cleaning data and an amount of time since the mobile cleaning robot cleaned the respective room.

In Example 4, the subject matter of Example 3 includes, wherein the cleaning report comprises location data of the mobile cleaning robot during one or more cleaning operations within each respective room, and wherein the method comprises: determining portions of rooms that were not cleaned by the mobile cleaning robot based on the location data of the mobile cleaning robot from the cleaning report; and updating the cleanliness score for each room based on the portions of rooms not cleaned by the mobile cleaning robot.

In Example 5, the subject matter of Example 4 includes, wherein generating a room cleaning ranking comprises: updating the room cleaning ranking based on one or more of the updated cleanliness score, a room type of each room of the environment, a room size of each room of the environment, a floor type of each room of the environment, and a mission type of each room of the environment.

In Example 6, the subject matter of Example 5 includes, wherein the room cleaning priority comprises the cleanliness score and a mission command for each respective room, wherein the mission command includes one or more operating parameters for the mobile cleaning robot, and wherein the one or more operating parameters comprises one or more of: a mission type of a planned mission by the mobile cleaning robot; cleaning parameters for the mission type; and an estimated runtime for the mission.

In Example 7, the subject matter of Example 6 includes, wherein the mission type includes a vacuum mission, a mopping mission, or a vacuum and mopping mission.

In Example 8, the subject matter of Examples 6-7 includes, wherein the one or more cleaning parameters include one or more of suction power of a vacuum, rotational speed of a cleaning roller, rotational speed of side brushes, liquid dispense amount, liquid dispense rate, scrubbing, mission type, or pattern of cleaning suggested for the mobile cleaning robot.

Example 9 is a mobile cleaning robot comprising: a drive system configured to move the mobile cleaning robot about an environment; a cleaning system; a memory device including instructions; and one or more processors coupled to the memory device, the one or more processors including processing circuitry that, when in operation, is configured by the instructions to: generate a cleanliness score for each room of the environment, each of the cleanliness scores indicative of an amount of debris expected in each respective room by the mobile cleaning robot; generate a room cleaning priority based at least partially on the cleanliness score of each of the rooms; and schedule operations of the mobile cleaning robot for a planned mission based on the room cleaning priority of each of the rooms of the environment.

In Example 10, the subject matter of Example 9 includes, wherein the instructions configure the processing circuitry to: update a cleaning report including the cleanliness score for each room cleaned by the mobile cleaning robot.

In Example 11, the subject matter of Example 10 includes, wherein the instructions configure the processing circuitry to: update the cleanliness score for each room based on historical degradation of each respective room of the environment, the historical degradation of each respective room based on historical cleaning data and an amount of time since the mobile cleaning robot cleaned the respective room.

In Example 12, the subject matter of Example 11 includes, wherein the cleaning report comprises location data of the mobile cleaning robot during one or more cleaning operations within each respective room, and wherein the instructions configure the processing circuitry to: determine portions of rooms that were not cleaned by the mobile cleaning robot based on the location data of the mobile cleaning robot from the cleaning report; and update the cleanliness score for each room based on the portions of rooms not cleaned by the mobile cleaning robot.

In Example 13, the subject matter of Example 12 includes, wherein generating a room cleaning ranking comprises the instructions configuring the processing circuitry to: update the room cleaning ranking based on one or more of the updated cleanliness score, a room type of each room of the environment, a room size of each room of the environment, a floor type of each room of the environment, and a mission type of each room of the environment.

In Example 14, the subject matter of Example 13 includes, wherein the room cleaning priority comprises the cleanliness score and a mission command for each respective room, wherein the mission command includes one or more operating parameters for the mobile cleaning robot, and wherein the one or more operating parameters comprises one or more of: a mission type of a planned mission by the mobile cleaning robot; cleaning parameters for the mission type; and an estimated runtime for the mission.

Example 15 is a mobile robot system for prioritizing cleaning of rooms of an environment comprising: a mobile cleaning robot including: a drive system configured to move the mobile cleaning robot about an environment; and a cleaning system; a mobile device operably in communication with the mobile cleaning robot; a memory device including instructions; and one or more processors coupled to the memory device, the one or more processors including processing circuitry that, when in operation, is configured by the instructions to: generate a cleanliness score for each room of the environment, each of the cleanliness scores indicative of an amount of debris expected in each respective room by the mobile cleaning robot; generate a room cleaning priority based at least partially on the cleanliness score of each of the rooms; and schedule operations of the mobile cleaning robot for a planned mission based on the room cleaning priority of each of the rooms of the environment.

In Example 16, the subject matter of Example 15 includes, wherein the instructions configure the processing circuitry to: update a cleaning report including the cleanliness score for each room cleaned by the mobile cleaning robot.

In Example 17, the subject matter of Example 16 includes, wherein the instructions configure the processing circuitry to: update the cleanliness score for each room based on historical degradation of each respective room of the environment, the historical degradation of each respective room based on historical cleaning data and an amount of time since the mobile cleaning robot cleaned the respective room.

In Example 18, the subject matter of Example 17 includes, wherein the cleaning report comprises location data of the mobile cleaning robot during one or more cleaning operations within each respective room, and wherein the instructions configure the processing circuitry to: determine portions of rooms that were not cleaned by the mobile cleaning robot based on the location data of the mobile cleaning robot from the cleaning report; and update the cleanliness score for each room based on the portions of rooms not cleaned by the mobile cleaning robot.

In Example 19, the subject matter of Example 18 includes, wherein generating a room cleaning ranking comprises the instructions configuring the processing circuitry to: update the room cleaning ranking based on one or more of the updated cleanliness score, a room type of each room of the environment, a room size of each room of the environment, a floor type of each room of the environment, and a mission type of each room of the environment.

In Example 20, the subject matter of Example 19 includes, wherein the room cleaning priority comprises the cleanliness score and a mission command for each respective room, wherein the mission command includes one or more operating parameters for the mobile cleaning robot, and wherein the one or more operating parameters comprises one or more of: a mission type of a planned mission by the mobile cleaning robot; cleaning parameters for the mission type; and an estimated runtime for the mission.

Example 21 is at least one machine-readable medium including instructions that, when executed by processing circuitry, cause the processing circuitry to perform operations to implement of any of Examples 1-20.

Example 22 is an apparatus comprising means to implement any of Examples 1-20.

Example 23 is a system to implement any of Examples 1-20.

Example 24 is a method to implement any of Examples 1-20.

Example 25 is at least one machine-readable medium, an apparatus, a system, or a method including any element of any of Examples 1-20.

The above detailed description includes references to the accompanying drawings, which form a part of the detailed description. The drawings show, by way of illustration, specific examples that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," or the like are used merely as labels, and are not intended to impose numerical requirements on their objects.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5). Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the examples should be determined with reference to the appended claims, along with the full scope of equivalents to which such claims are entitled.

The invention claimed is:

1. A method of prioritizing cleaning of rooms of an environment for a mobile cleaning robot, the method comprising:
   generating, using a controller, a cleanliness score for each room of the environment, each of the cleanliness scores indicative of an amount of debris expected in each respective room by the mobile cleaning robot;
   generating a room cleaning priority based at least partially on the cleanliness score of each of the rooms;
   scheduling operations of the mobile cleaning robot for a planned mission based on the room cleaning priority of each of the rooms of the environment;
   updating a cleaning report including the cleanliness score for each room cleaned by the mobile cleaning robot; and
   updating the cleanliness score for each room based on historical degradation of each respective room of the environment, the historical degradation of each respective room based on historical cleaning data and an amount of time since the mobile cleaning robot cleaned the respective room.

2. The method of claim 1, wherein the cleaning report comprises location data of the mobile cleaning robot during one or more cleaning operations within each respective room, and wherein the method comprises:
   determining portions of rooms that were not cleaned by the mobile cleaning robot based on the location data of the mobile cleaning robot from the cleaning report; and updating the cleanliness score for each room based on the portions of rooms not cleaned by the mobile cleaning robot.

3. The method of claim 2, wherein generating a room cleaning ranking comprises:
updating the room cleaning ranking based on one or more of the updated cleanliness score, a room type of each room of the environment, a room size of each room of the environment, a floor type of each room of the environment, and a mission type of each room of the environment.

4. The method of claim 3, wherein the room cleaning priority comprises the cleanliness score and a mission command for each respective room, wherein the mission command includes one or more operating parameters for the mobile cleaning robot, and wherein the one or more operating parameters comprises one or more of:
a mission type of a planned mission by the mobile cleaning robot;
cleaning parameters for the mission type; and
an estimated runtime for the mission.

5. The method of claim 4, wherein the mission type includes a vacuum mission, a mopping mission, or a vacuum and mopping mission.

6. The method of claim 4, wherein the one or more cleaning parameters include one or more of suction power of a vacuum, rotational speed of a cleaning roller, rotational speed of side brushes, liquid dispense amount, liquid dispense rate, scrubbing, mission type, or pattern of cleaning suggested for the mobile cleaning robot.

7. A mobile cleaning robot comprising:
a drive system configured to move the mobile cleaning robot about an environment;
a cleaning system;
a memory device including instructions; and
one or more processors coupled to the memory device, the one or more processors including processing circuitry that, when in operation, is configured by the instructions to:
generate a cleanliness score for each room of the environment, each of the cleanliness scores indicative of an amount of debris expected in each respective room by the mobile cleaning robot;
generate a room cleaning priority based at least partially on the cleanliness score of each of the rooms;
schedule operations of the mobile cleaning robot for a planned mission based on the room cleaning priority of each of the rooms of the environment;
update a cleaning report including the cleanliness score for each room cleaned by the mobile cleaning robot; and
update the cleanliness score for each room based on historical degradation of each respective room of the environment, the historical degradation of each respective room based on historical cleaning data and an amount of time since the mobile cleaning robot cleaned the respective room.

8. The mobile cleaning robot of claim 7, wherein the cleaning report comprises location data of the mobile cleaning robot during one or more cleaning operations within each respective room, and wherein the instructions configure the processing circuitry to:
determine portions of rooms that were not cleaned by the mobile cleaning robot based on the location data of the mobile cleaning robot from the cleaning report; and
update the cleanliness score for each room based on the portions of rooms not cleaned by the mobile cleaning robot.

9. The mobile cleaning robot of claim 8, wherein generating a room cleaning ranking comprises the instructions configuring the processing circuitry to:
update the room cleaning ranking based on one or more of the updated cleanliness score, a room type of each room of the environment, a room size of each room of the environment, a floor type of each room of the environment, and a mission type of each room of the environment.

10. The mobile cleaning robot of claim 9, wherein the room cleaning priority comprises the cleanliness score and a mission command for each respective room, wherein the mission command includes one or more operating parameters for the mobile cleaning robot, and wherein the one or more operating parameters comprises one or more of:
a mission type of a planned mission by the mobile cleaning robot;
cleaning parameters for the mission type; and
an estimated runtime for the mission.

11. A mobile robot system for prioritizing cleaning of rooms of an environment comprising:
a mobile cleaning robot including:
a drive system configured to move the mobile cleaning robot about an environment; and
a cleaning system;
a mobile device operably in communication with the mobile cleaning robot;
a memory device including instructions; and
one or more processors coupled to the memory device, the one or more processors including processing circuitry that, when in operation, is configured by the instructions to:
generate a cleanliness score for each room of the environment, each of the cleanliness scores indicative of an amount of debris expected in each respective room by the mobile cleaning robot;
generate a room cleaning priority based at least partially on the cleanliness score of each of the rooms;
schedule operations of the mobile cleaning robot for a planned mission based on the room cleaning priority of each of the rooms of the environment;
update a cleaning report including the cleanliness score for each room cleaned by the mobile cleaning robot; and
update the cleanliness score for each room based on historical degradation of each respective room of the environment, the historical degradation of each respective room based on historical cleaning data and an amount of time since the mobile cleaning robot cleaned the respective room.

12. The mobile robot system of claim 11, wherein the cleaning report comprises location data of the mobile cleaning robot during one or more cleaning operations within each respective room, and wherein the instructions configure the processing circuitry to:
determine portions of rooms that were not cleaned by the mobile cleaning robot based on the location data of the mobile cleaning robot from the cleaning report; and
update the cleanliness score for each room based on the portions of rooms not cleaned by the mobile cleaning robot.

13. The mobile robot system of claim 12, wherein generating a room cleaning ranking comprises the instructions configuring the processing circuitry to:

update the room cleaning ranking based on one or more of the updated cleanliness score, a room type of each room of the environment, a room size of each room of the environment, a floor type of each room of the environment, and a mission type of each room of the environment.

14. The mobile robot system of claim 13, wherein the room cleaning priority comprises the cleanliness score and a mission command for each respective room, wherein the mission command includes one or more operating parameters for the mobile cleaning robot, and wherein the one or more operating parameters comprises one or more of:

a mission type of a planned mission by the mobile cleaning robot;
cleaning parameters for the mission type; and
an estimated runtime for the mission.

* * * * *